(12) United States Patent
Zhang et al.

(10) Patent No.: US 7,321,926 B1
(45) Date of Patent: Jan. 22, 2008

(54) METHOD OF AND SYSTEM FOR ALLOCATING RESOURCES TO RESOURCE REQUESTS

(75) Inventors: Hui Zhang, Cupertino, CA (US); Erik de la Iglesia, Mountain View, CA (US); Miguel Gomez, Fremont, CA (US); Liang Liu, San Jose, CA (US); Rick K. Lowe, Menlo Park, CA (US); Mark Aaron Wallace, San Jose, CA (US); Wei Wang, San Jose, CA (US)

(73) Assignee: Extreme Networks, Santa Clara, CA (US)

( * ) Notice: Subject to any disclaimer, the term of this patent is extended or adjusted under 35 U.S.C. 154(b) by 539 days.

(21) Appl. No.: 10/074,462

(22) Filed: Feb. 11, 2002

(51) Int. Cl.
*G06F 15/177* (2006.01)
*G06F 9/46* (2006.01)
*H04Q 7/20* (2006.01)

(52) U.S. Cl. .................. 709/220; 455/453; 718/104; 718/105

(58) Field of Classification Search ............ 709/105, 709/220, 225, 226, 224; 379/112.04, 114.17; 455/453; 718/104, 105
See application file for complete search history.

(56) References Cited

U.S. PATENT DOCUMENTS

| | | |
|---|---|---|
| 4,766,534 A | 8/1988 | DeBenedictis |
| 5,315,708 A | 5/1994 | Eidler et al. |
| 5,396,490 A | 3/1995 | White et al. |
| 5,528,761 A | 6/1996 | Ooba et al. |
| 5,553,242 A | 9/1996 | Russell et al. |
| 5,561,807 A | 10/1996 | Verplanken et al. |
| 5,745,694 A | 4/1998 | Egawa et al. |
| 5,826,082 A | 10/1998 | Bishop et al. |
| 5,937,169 A | 8/1999 | Connery et al. |
| 5,974,518 A | 10/1999 | Nogradi |
| 6,091,733 A | 7/2000 | Takagi et al. |
| 6,208,650 B1 | 3/2001 | Hassell et al. |
| 6,212,190 B1 | 4/2001 | Mulligan |
| 6,233,615 B1 | 5/2001 | Van Loo |
| 6,304,906 B1 | 10/2001 | Bhatti et al. |

(Continued)

OTHER PUBLICATIONS

Saunders, Stephen et al.; "The Policy Makers"; Data Communications; pp. 34-35 and 36-56 (even only), May, 1999.

(Continued)

*Primary Examiner*—John Follansbee
*Assistant Examiner*—Ashok B. Patel
(74) *Attorney, Agent, or Firm*—Blakely Sokoloff Taylor & Zafman, LLP

(57) ABSTRACT

A system and method of allocating a resource to a service request. Servers are virtually assigned through a hierarchy including groups of servers and super groups of the groups of servers. Each service request type is associated with a service index that determines both a super group and a load balancing policy for that service request type. A load balancing policy may be applied to select a group of servers among several server groups associated with the super group. Another load balancing policy is applied to the selected group of servers to select a server to handle the service request. The hierarchical data structure allows servers to be configured into overlappable, arbitrary subsets that can address service requests matching configured content rules. Load balancing policies can be selected by service request type.

15 Claims, 21 Drawing Sheets

U.S. PATENT DOCUMENTS

| | | |
|---|---|---|
| 6,327,622 B1 | 12/2001 | Jindal et al. |
| 6,341,129 B1 | 1/2002 | Schroeder et al. |
| 6,363,421 B2 | 3/2002 | Barker et al. |
| 6,411,986 B1 | 6/2002 | Susai et al. |
| 6,453,360 B1 | 9/2002 | Muller et al. |
| 6,480,489 B1 | 11/2002 | Muller et al. |
| 6,490,281 B1 | 12/2002 | Abler et al. |
| 6,526,056 B1 | 2/2003 | Rekhter et al. |
| 6,532,487 B1 | 3/2003 | Perks |
| 6,549,516 B1 | 4/2003 | Albert et al. |
| 6,549,961 B1 | 4/2003 | Kloth |
| 6,606,315 B1 | 8/2003 | Albert et al. |
| 6,606,316 B1 | 8/2003 | Albert et al. |
| 6,625,650 B2 | 9/2003 | Stelliga |
| 6,628,654 B1 | 9/2003 | Albert et al. |
| 6,633,560 B1 | 11/2003 | Albert et al. |
| 6,650,641 B1 | 11/2003 | Albert et al. |
| 6,687,222 B1 | 2/2004 | Albert et al. |
| 6,704,278 B1 | 3/2004 | Albert et al. |
| 6,714,985 B1 | 3/2004 | Malagrino et al. |
| 6,724,767 B1 | 4/2004 | Chong et al. |
| 6,728,748 B1 * | 4/2004 | Mangipudi et al. ......... 718/105 |
| 6,735,169 B1 | 5/2004 | Albert et al. |
| 6,742,045 B1 | 5/2004 | Albert et al. |
| 6,775,692 B1 | 8/2004 | Albert et al. |
| 6,781,992 B1 | 8/2004 | Rana et al. |
| 6,788,704 B1 | 9/2004 | Lindsay |
| 6,836,462 B1 | 12/2004 | Albert et al. |
| 6,839,811 B2 | 1/2005 | Fujiyama |
| 6,891,839 B2 | 5/2005 | Albert et al. |
| 6,937,606 B2 | 8/2005 | Basso et al. |
| 6,973,097 B1 | 12/2005 | Donzis et al. |
| 7,065,086 B2 | 6/2006 | Basso et al. |
| 7,072,981 B1 | 7/2006 | O'Rourke et al. |
| 2001/0034792 A1 * | 10/2001 | Swildens .................... 709/238 |
| 2001/0052006 A1 | 12/2001 | Barker et al. |
| 2001/0055317 A1 | 12/2001 | Kajizaki et al. |
| 2002/0016856 A1 | 2/2002 | Tallegas et al. |
| 2002/0087694 A1 * | 7/2002 | Daoud et al. ............... 709/226 |
| 2002/0129127 A1 * | 9/2002 | Romero et al. ............. 709/220 |
| 2002/0141401 A1 | 10/2002 | Albert et al. |
| 2003/0009561 A1 | 1/2003 | Sollee |
| 2003/0014525 A1 | 1/2003 | De Lima et al. |
| 2003/0093496 A1 | 5/2003 | O'Connor et al. |
| 2003/0149690 A1 | 8/2003 | Kudlacik et al. |
| 2004/0162901 A1 | 8/2004 | Mangipudi et al. |
| 2005/0010754 A1 | 1/2005 | Brendel |
| 2006/0080446 A1 | 4/2006 | Bahl |

OTHER PUBLICATIONS

Postel, "RFC 792 - ICMP," 1981, pp. 1-4.

Mogul et al., "RFC 1191 - Path MTU Discovery," 1990, pp. 1-3.

\* cited by examiner

FIGURE 10C

| | 33 32:31 | | | | | 0 |
|---|---|---|---|---|---|---|
| SOP | Reserved | CSI[21:0] | | | | |
| MOP | Client_IP_Addr[31:0] | | | | | |
| MOP | Reserved | CTLB[23:0] | | | | |
| MOP | Reserved | Client_Port_Num[15:0] | | | | |
| MOP | cid_valid | sid_valid | cookie_id[29:0]/session_id[29:0] | | | |
| MOP | cookie_hashing_valid | cookie_hashing_id[15:0] | | | | |
| MOP | server_id_valid | server_id[15:0] | | | | |
| MOP | Reserved | BSI[15:0] | | | | |
| EOP | Reserved | | | | | |

| 63 | 56/55 | 32/32 | 0 |
|---|---|---|---|
| POLICY | SUPER GROUP ADDR0 | TOTAL SERVICE COUNT | |
| CURRENT SERVICE COUNT | | PEAK SERVICE COUNT | |

170 — SERVICE INDEX TABLE ENTRY  FIG. 18

| 63 | 48/47 | 32/31 | 24/23 | 15/14 | 10/9 | 0 |
|---|---|---|---|---|---|---|
| RESERVED | SERVER PORT NO. | RES'D | CURRENT NO. | RES'D | MEMBER NO. | |
| RES'D | BASE GROUP ADDR0 | RES'D | BASE GROUP ADDR1 | | | |

180 — SUPER GROUP TABLE ENTRY  FIG. 19

| 63 | 48/47 | 32/31 | 0 |
|---|---|---|---|
| RESERVED | PROXY SERVER PORT NO. | PROXY SERVER IP ADDRESS | |

190 — PROXY SERVER PORT SELECT TABLE ENTRY  FIG. 20

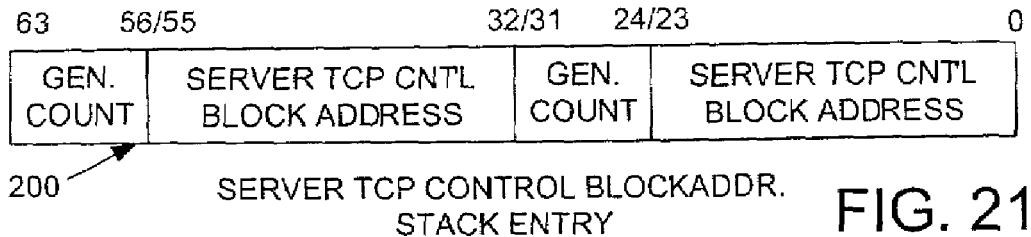
FIG. 21
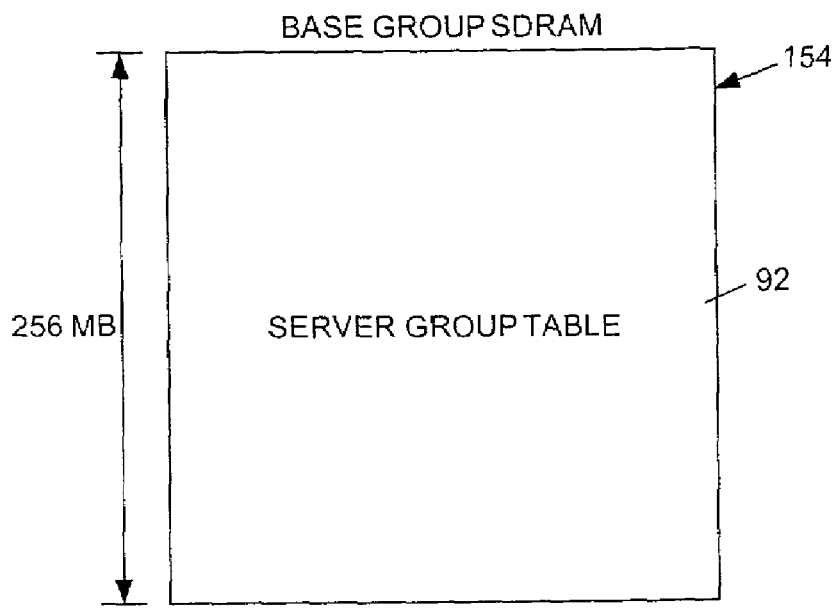
FIG. 22
FIG. 23

METHOD OF AND SYSTEM FOR ALLOCATING RESOURCES TO RESOURCE REQUESTS

RELATED APPLICATIONS

This application is related to U.S. Provisional Application No. 60/335,922, entitled "Network Switch"; U.S. patent application Ser. No. 10/073,483, entitled "Method Of And System For Allocating Resources To Resource Requests Based On Application Of Persistence Policies"; U.S. patent application Ser. No. 10/073,538, now U.S. Pat. No. 7,152,124, entitled "Method And System For Maintaining Temporal Consistency Of Resources And Data In A Multiple-Processor Packet Switch"; U.S. patent application Ser. No. 10/073,638, now U.S. Pat. No. 6,781,990, entitled "Method And System For Managing Traffic In A Packet Network Environment"; U.S. patent application Ser. No. 10/073,484, entitled "Method And System For Translating Packet Sizes In A Network"; and U.S. patent application Ser. No. 10/098,957, entitled "Switching System." Each of the foregoing applications is filed concurrently herewith, and owned in common by the assignee hereof. Moreover, each of these applications is fully incorporated herein by reference as though set forth in full.

1. Field of the Invention

This invention relates generally to data networks and load balancing, and more particularly to a method of and system for allocating resources to resource requests which, in one example application, may be used to allocate servers to resource requests from clients.

2. Related Art

Server load balancing is a technique in which client requests for services are distributed across a plurality of servers. In this way, overloading of any particular server is avoided, and more than one server is available to service the requests.

Server load balancing is typically performed by a network appliance called a director or web switch. The director or web switch is programmed with a network address to which the client requests are directed. The director or web switch receives the client requests, and forwards each request to a selected one of the servers. Such a director or web switch serves two main purposes. Firstly, it increases web site availability by allowing for web servers to fail (or be shut down for maintenance) without rendering the web site unavailable. Secondly, it decreases the web site's response time and increases the traffic handling capacity by allowing multiple servers to be used together as a single web site.

Prior approaches to server load balancing have used centralized programmed central processing units (CPUs) dedicated to handling the complex task of allocating client requests to servers. Due to the complexity of this task, there have been bottlenecks due to limited CPU time and CPU memory bandwidth. These limitations have presented significant scaling and web transaction latency issues to web site administrators. What is desired is a solution that can scale to millions of concurrent connections and can forward client requests at the physical media rate (such as a gigabit line rate).

SUMMARY OF THE INVENTION

A first embodiment of the invention comprises a system for allocating a resource to a service request representing a request for a category of service selected from amongst a plurality of possible categories. The system comprises first logic for selecting a policy from amongst a plurality of possible policies responsive to the selected category, and second logic for applying the selected policy to allocate a resource to the request selected from one or more candidate resources.

A second embodiment of the invention comprises a system for allocating a resource to a service request. The system comprises first logic for determining one or more candidate resources using a hierarchical arrangement of data structures, the hierarchical arrangement having a plurality of levels, and second logic for selecting one of the candidate resources, and allocating the selected resource to the service request.

A third embodiment of the invention comprises a system for allocating a resource to a service request. The system comprises first logic for specifying a plurality of resources which are candidates for allocating to the request, second logic for accessing in parallel loading information for each of the candidate resources, and third logic for allocating one of the candidate resources to the request responsive to the accessed loading information.

In one implementation, where the resources are servers, the system comprises a service index table, a super-group table, a server group table, and a server loading table. The service index table comprises a plurality of entries which each associate a service index with a super-group and a load balancing policy. The server-group table comprises a plurality of entries which each associate a server super-group with one or more server groups. The server group table comprises a plurality of entries which each associate a server group within one or more servers. The server loading table comprises a plurality of entries which each indicate the current loading of a server.

A service index derived from the service request forms an index into the service index table which is used to access an entry in the table. The entry specifies a server super-group to be allocated to the request, and a load balancing policy to be applied.

An index to the super-group table is derived from the super-group allocated to the request and used to access an entry in the super-group table. The entry specifies one or more server groups which are candidates for allocating to the request. A suitable load balancing policy (which may be different from the load balancing policy specified by the entry accessed in the service index table) is applied to select one of these server groups and allocate it to the request.

An index is derived from the server group which is allocated and used to access an entry in the server group table. The entry specifies one or more servers which are candidates for allocating to the request. The load balancing policy specified by the entry accessed in the service index table is applied to select one of these servers and allocate it to the request.

A persistence policy may also be applied to identify a server which should be allocated to the request. In one implementation example, any such policy, if applicable, overrides application of the load balancing policy.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 10C illustrates an example format of a service request from the binding lookup table to the policy engine;

FIG. 10D illustrates an example format of a service request from the content analyzer to the policy engine;

FIG. 18 shows an entry of one implementation of a service index table;

FIG. 19 shows an entry of one implementation of a super group table;

FIG. 20 shows an entry of one implementation of a proxy server port select table;

FIG. 21 shows an entry of one implementation of an entry in a proxy server Transmission Control Protocol (TCP) control block address stack;

FIG. 22 is a memory map of one implementation of a base group memory;

FIG. 23 shows an entry of one implementation of a server group table;

DETAILED DESCRIPTION

Example Application

An example application of a system and method according to the invention is described in this section. This example is being provided solely to add context and aid in the understanding of the invention. Other applications are possible, so this example should not be taken as limiting.

Figure 1:
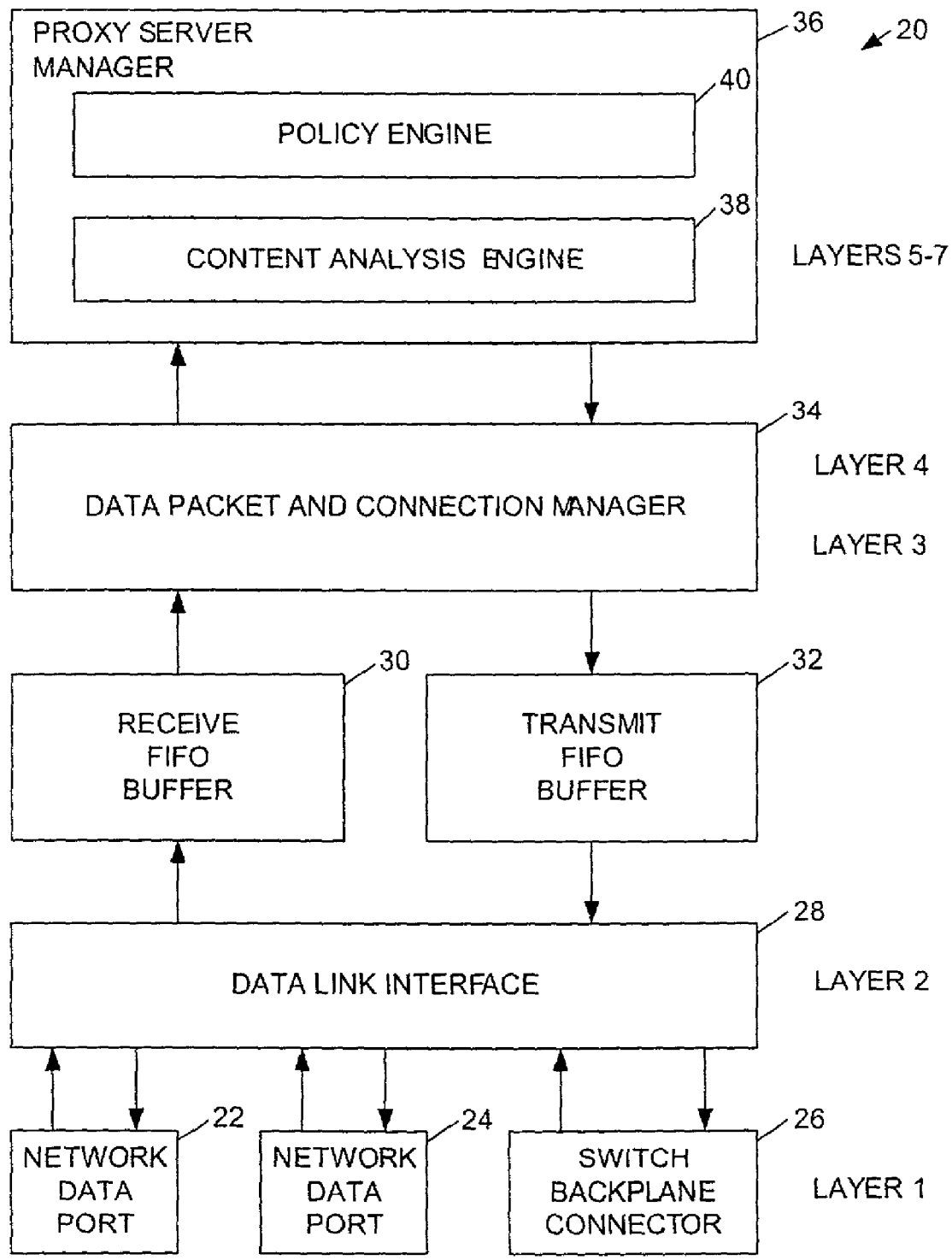
FIG. 1 is a block diagram of one embodiment of a proxy server load balancer incorporating the present invention.

With reference to FIG. 1, there is shown a block diagram of one embodiment of a proxy server load balancer 20 incorporating the present invention. The functional blocks of the proxy server load balancer 20 are organized into various layers 1 to 5 corresponding to the Reference Model for Open Systems Interconnection (OSI) promulgated by the International Standards Organization (ISO). Layer 1 is the physical layer, layer 2 is the data link layer, layer 3 is the network layer, layer 4 is the transport layer, layer 5 is the session layer, layer 6 is the presentation layer, and layer 7 is the application layer.

The physical layer 1 includes the electrical and mechanical characteristics of the proxy server load balancer 20 that are used to transfer data bits to and from the data network. In particular, in one implementation, the proxy server load balancer 20 has at least two network data ports 22, 24 and a switch backplane connector 26, which can be used in various ways to connect the proxy server load balancer to a data network, as further described below with reference to FIGS. 2 to 4.

The data link layer 2 includes a data link interface 28 that implements at least one protocol for error-free communication with other devices across the data network. For example, in one implementation, the data link layer 2 may implement a gigabit Ethernet protocol. Associated with the data link interface 28 is a receive first-in first-out (FIFO) buffer 30 and a transmit FIFO buffer 32, which serve as an interface between the data link layer 2 and the network layer 3. The network layer 3 includes a data packet and connection manager 34 that implements a protocol for routing, congestion control, and user-network communication. For example, the data packet and connection manager 34 may implement the Internet Protocol (IP).

The transport layer 4 implements functions and classes of service for error-free communication between hosts across the sub-network. The data packet and connection manager 34 also implements the transport layer 4. For example, the data packet and connection manager 34 may implement the Transmission Control Protocol (TCP) and the User Datagram Protocol (UDP).

The session layer 5 includes a proxy server manager 36 that implements process-to-process communication, error recovery, and session synchronization. In particular, in one embodiment, the proxy server manager 36 has a content analysis engine 38, which analyzes the content of Hypertext Transfer Protocol (HTTP) headers for information relevant to routing policies. The proxy server manager 36 also has a policy engine 40, which applies a load balancing policy or a persistence policy to select a server to serve each client request forwarded by the proxy server load balancer 20.

In one embodiment, the functional blocks of the proxy server load balancer of FIG. 1 may be implemented in hardware, software, or a combination of hardware and software. In another embodiment, the functional blocks of the proxy server load balancer 20 in FIG. 1 are implemented in dedicated hardware to handle all aspects of web server load balancing. In particular, the proxy server manager 36 and the data packet and connection manager 34 may be comprised of finite state machines (such as the content analysis engine 38 and the policy engine 40) that operate in parallel or pipelined fashion. In one implementation, the finite state machines are comprised of digital logic and state and control registers implemented in field programmable gate arrays (FPGAs), and the state machines operate upon various tables in static random access memory (SRAM) or synchronous dynamic random access memory (SDRAM), as will be further described below. The state machines and state memory could alternatively be implemented in other customizable logic such as application specific integrated circuits (ASICs), or even full-custom circuits. In this particular implementation, because there are no CPUs involved in the data path of the proxy server load balancer 20, there are no bottlenecks for CPU time or CPU memory bandwidth. This allows the proxy server load balancer to handle connections at the physical media rate (in this case gigabit line rate), and scale to millions of concurrent connections. Instead of focusing on connection budgets, the web site administrators can focus on the web site.

One application for the proxy server load balancer 20 is to balance Internet client service requests to a web site including a multiplicity of servers. In this case, the proxy server load balancer 20 creates a level of abstraction between the Internet and the servers. This is done by configuring a Virtual Internet Protocol address (VIP) on the proxy server load balancer 20 which corresponds to the Directory Name Service (DNS) entry for the web site. This results in all traffic for the site being sent to the proxy server load balancer 20. The proxy server load balancer applies policies or client-server stickiness to decide how to forward the client requests, and then forwards each client request to a selected one of the servers.

Figure 2:
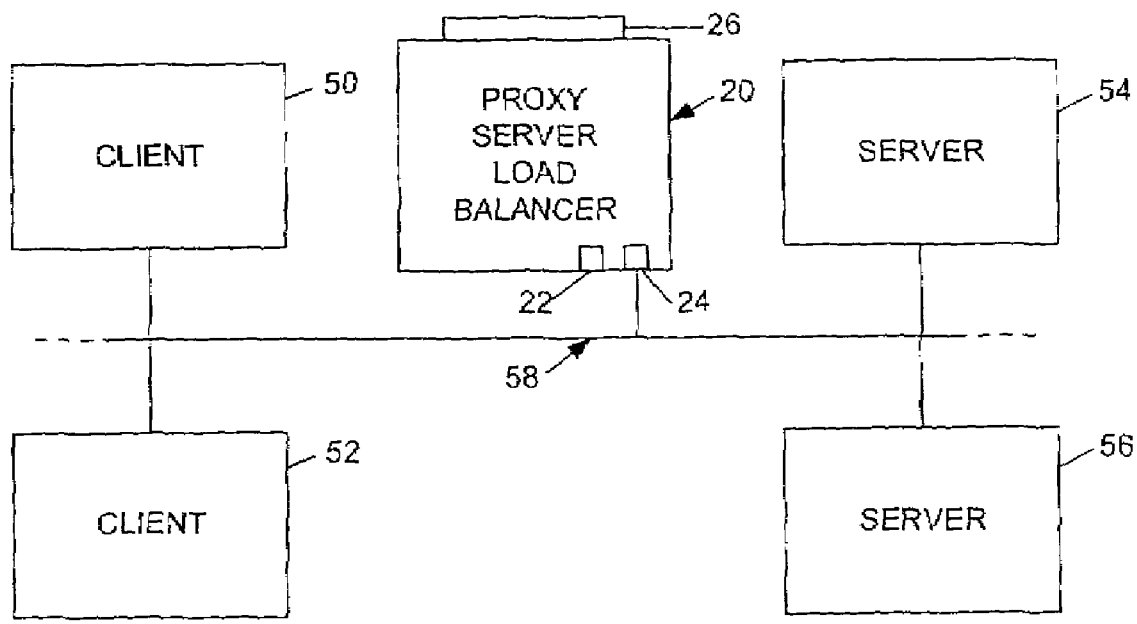
FIG. 2 is a block diagram showing a first way of attaching the proxy server load balancer of FIG. 1 to a data network.
Figure 3:
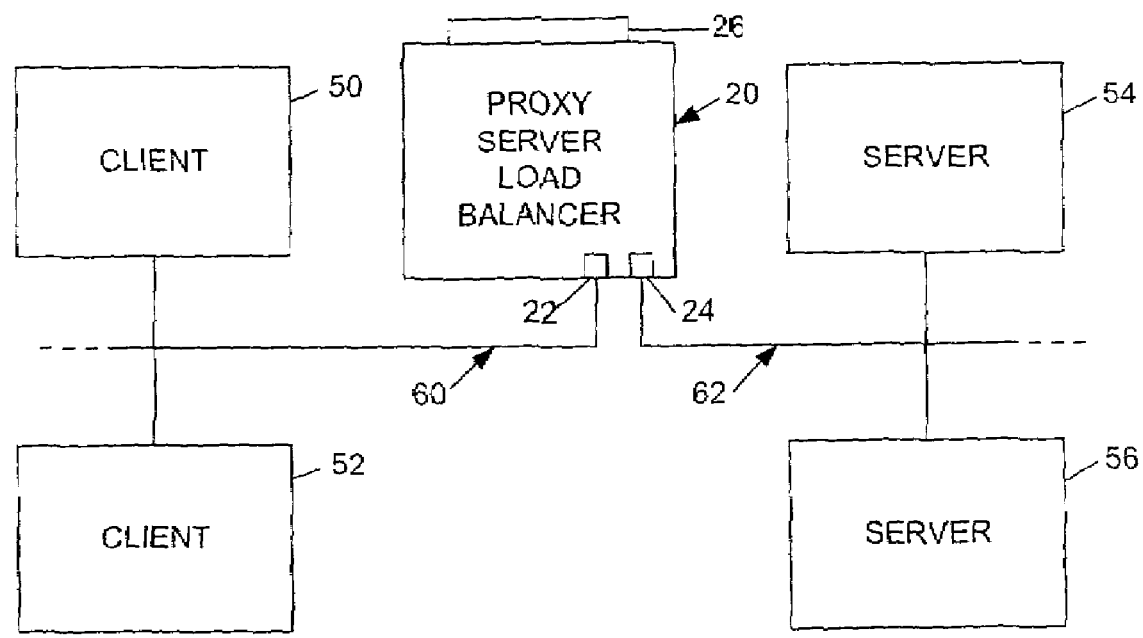
FIG. 3 is a block diagram showing a second way of attaching the proxy server load balancer of FIG. 1 to a data network.

In a preferred implementation, the proxy server load balancer 20 is physically configured as a circuit board which can be deployed as a network appliance or as a blade in a gigabit Ethernet chassis switch. The deployment of the proxy server load balancer 20 as a network appliance is shown in FIGS. 2 and 3. The deployment of the proxy server load balancer 20 as a blade in a gigabit Ethernet chassis switch is shown in FIG. 4.

With reference to FIG. 2, for example, a common data link 58 links the proxy server load balancer 20 to the clients 50 and 52 and servers 54 and 56. The proxy server's network data port 24 is linked directly to the common data link 58. In this case, the clients 50 and 52 may direct their requests to a selected one of the servers 54 and 56. The clients 50 and 52 may also direct their requests to the proxy server load balancer 20 by addressing the network data port 24. In this case, the proxy server load balancer may select a respective one of the servers to handle each request and forward the request to the selected server.

With reference to FIG. 3, for example, the network has been reconfigured so that a first data link 60 links the clients 50 and 52 to the proxy server's network data port 22, and a second data link 62 links the servers 54 and 56 to the proxy server's network data port 24. In this case, the clients may not directly access the servers. Instead, the clients may access the servers only by addressing the proxy server's network data port 22. In this case, the proxy server load balancer 20 may select a respective one of the servers to service each client request.

Figure 4:
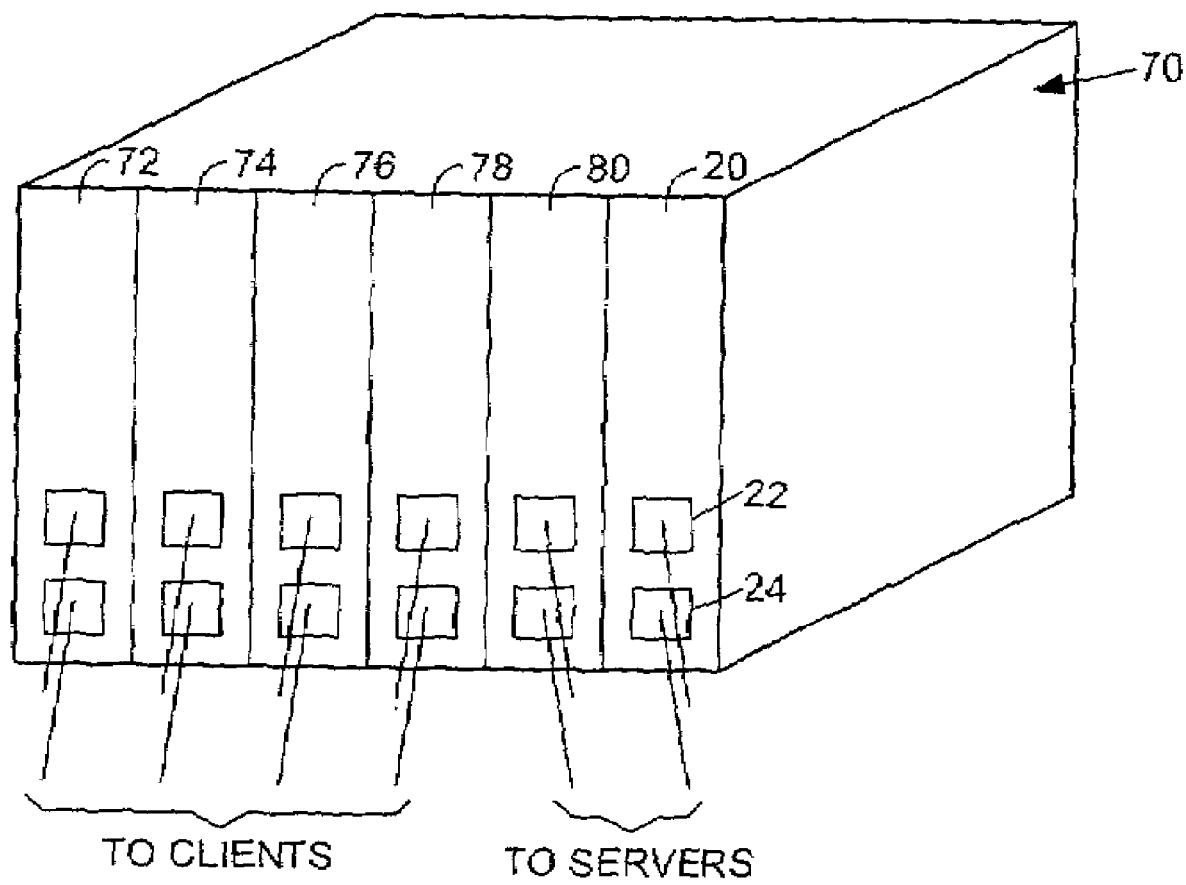
FIG. 4 is a pictorial view showing how the proxy server load balancer of FIG. 1 can be installed into a web switch rack.

With reference to FIG. 4, the proxy server load balancer 20 may be inserted into a gigabit Ethernet chassis switch generally designated 70. The network data ports 22 and 24 link the proxy server load balancer 20 to a multiplicity of servers. The gigabit Ethernet chassis switch 70 has a number of conventional circuit board switch blades 72, 74, 76, and 78 having similar network data ports linked to clients. The blades 72, 74, 76, and 78 switch requests from the clients to the backplane connector (26 in FIGS. 1, 2, and 3) of the proxy server load balancer 20, and the proxy server load balancer 20 then forwards each request to a respective server directly linked to the network port 22 and 24. It is also possible to configure the proxy server load balancer 20 to receive a client request from its backplane connector (26 in FIGS. 1, 2 and 3), translate the destination Internet Protocol (IP) address and port address of the request, and return the request back to the backplane connector, for further processing by the routing function of the gigabit Ethernet chassis switch 70.

FIG. 4 shows a second blade 80 having direct links to network clients. The blade 80 could be either a conventional circuit board switch blade or a proxy server load balancer similar to the proxy server load balancer 20. When there are more than one proxy server load balancer blade in the gigabit Ethernet chassis switch 70, each proxy server load balancer blade may perform server load balancing independently of the other proxy server load balancer blades.

In one implementation, the data packet and connection manager 34 in FIG. 1 implements a TCP/IP stack. Client traffic arriving at the data packet and connection manager 34 is initially classified as to which level of service is being requested (service index) and who is making the request (client identifier). For level 4 service (i.e., non content-enabled service), these values are used directly in the proxy server manager 36 for implementation of policy considerations. For level 5 to level 7 service (i.e., content-enabled service) these initial values are may be qualified inside the proxy server manager 36 according to content and history based rules for implementing certain content-based and persistence policies. Once they have been qualified, a final set of values may be computed and used for implementation of policy considerations. For HTTP, content rules that may modify the service index relate to factors such as the Universal Resource Locator (URL) path or the host (domain) represented or indicated in the request, and content rules that modify the client identifier include a cookie identifier represented or indicated in the request. Secure HTTP (HTTPS) is also supported, and the client identifier may be modified by a Secure Socket Layer (SSL) identifier.

In the case of layer 4 service, the proxy server load balancer 20 may use a Network Address Translation (NAT) approach. When a client requests a new connection to the web site at the virtual IP address of the proxy server load balancer 20, the proxy server load balancer selects a respective one of the servers based on the load balancing policy associated with the web site. The proxy server load balancer 20 will then rewrite the destination IP address of the request to point to the server selected to handle the request, and set the source IP address of the request to point to an IP address of the proxy server load balancer. When the selected server responds to the request, the proxy server load balancer 20 receives the response and rewrites the response so that it will appear to originate from the virtual IP address of the proxy server load balancer, and forwards the response to the client.

UDP is handled as a layer 4 service. For UDP, a message format such as the Domain Name System (DNS) is used so that the server-return traffic is a single response stream sent back to the same client request port number.

In the case of layer 5-7 service, the proxy server load balancer 20 first acts as a proxy for the server by acting as an endpoint for the TCP/IP connection from the client, so that the proxy server load balancer can look at the content of the request being made by the client. The proxy server manager (36 in FIG. 1) takes the content being requested, along with the domain to which the request pertains, and applies policy rules described further below with reference to FIG. 5. During this time, the proxy server load balancer 20 buffers data associated with the request, and acknowledges receipt of the data as appropriate. Based on the outcome of the policy decision, the proxy server load balancer 20 establishes a TCP connection with the server selected to process the request. To establish a connection with the server, the proxy load balancer 20 sends a SYN packet to the server, and, after the server returns a SYN-ACK, sends an ACK to the server, thus completing the establishment of the connection. Thus, it can be seen that, during the connection establishment phase, the proxy server load balancer 20 acts as a proxy to both the server and the client.

Once a connection is established between the proxy server load balancer 20 and the selected server, the proxy server load balancer forwards the buffered data associated with the request to the selected server, and receives the ACK packet returned by the server. The selected server may also return data to the proxy server load balancer 20 for sending on the client. In this case, the proxy server load balancer 20 translates the IP source address, port number, TCP sequence, and acknowledgement numbers, and forwards the data to the client. In this fashion, during the data phase, the proxy server load balancer 20 operates as a proxy for the server, but not for the client.

Figure 5:
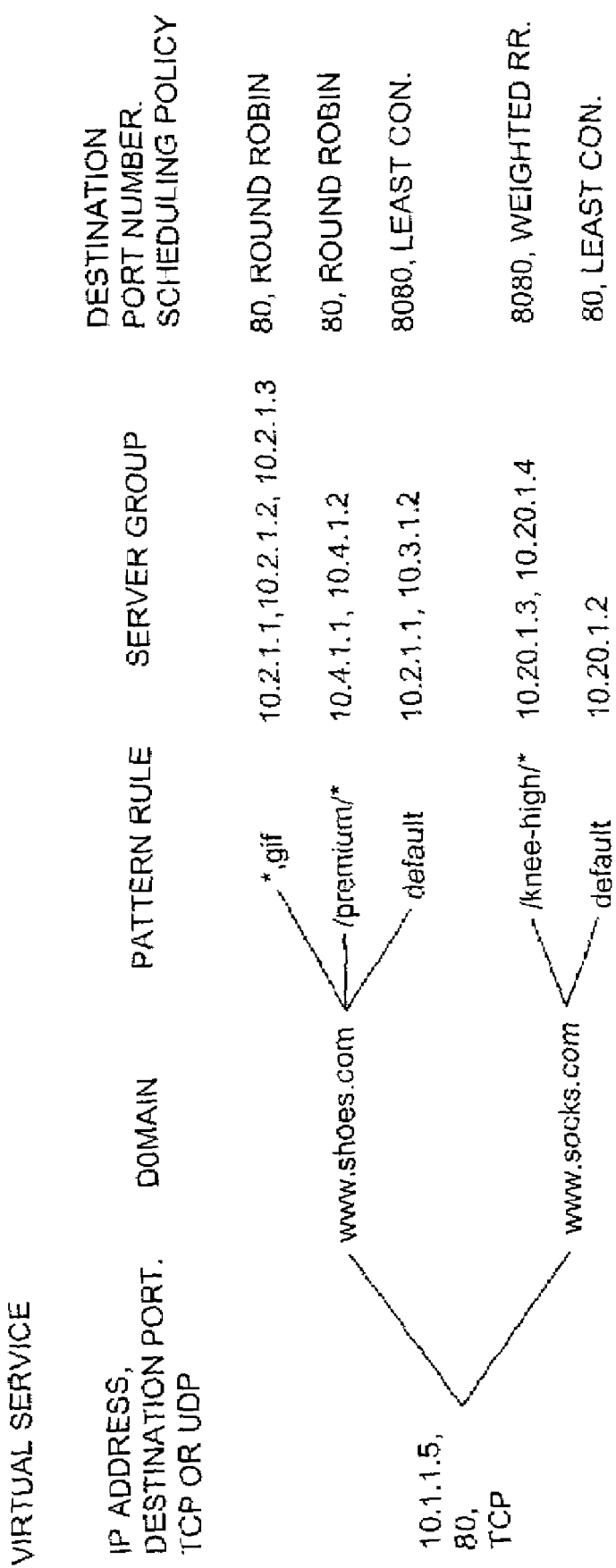
FIG. 5 shows an example of decision rules applied by the proxy server load balancer of FIG. 1 when making forwarding decisions based on content of client requests.

FIG. 5 shows an example of layer 5-7 policy rules. The layer 5-7 policy rules allow the proxy server manager (36 in FIG. 1) to make forwarding decisions based on the domain name requested by the user, and string patterns in the URL. The layer 5-7 policy rules are keyed off unique combinations of Virtual IP address, destination port number, and protocol (TCP or UDP) found in the client request. The proxy server manager then looks into the client request and determines the domain. Once the domain has been determined, the URL is matched against a list of pattern rules. Each of the pattern rules has its own server group associated with it. Once a match has been found, the user-configured load balancing policy or scheduling policy is applied to the server group, and the client request is forwarded to the selected server at the user-configured destination port number.

The layer 5-7 pattern rules permit HTTP traffic to be load balanced on the basis of the destination domain only, or a combination of the destination domain and URL. The content analysis engine (38 in FIG. 1) examines the client request HTTP header (up to 1460 bytes) for domain and URL strings, and the URL string is then checked against user-configured string patterns to make a load balancing decision. HTTPS traffic is checked for SSL 3.0 session-id strings by the layer 5-7 mechanisms, in order to provide session persistence. Preferably, the HTTPS traffic is not decrypted by the proxy server load balancer 20, so in the absence of persistence it is load balanced at layer 4, based on the Virtual IP and destination port numbers, and the specified protocol.

As shown in FIG. 5, the string patterns for the URLs can contain a single "*" as a wildcard adjacent to a "/" or "." delimiter. The patterns can be matched in the following ways: keyword, /keyword, keyword/, keyword1/*/keyword2, and a default action. Each pattern rule (or domain name if no pattern rules are used) has its own associated server group, scheduling policy, and rewrite port number.

The policy engine (40 in FIG. 1) supports a number of scheduling policies and persistence policies. The scheduling policies included hashing, round robin, weighted round robin, utilization percentage, least connections, weighted least connections, and priority scheduling. Other scheduling policies may also be used.

Hashing uses the IP address of the client to assign the request to a given Virtual IP deterministically within a server group. This has the advantage of always sending clients (who keep the same domain name or host IP) to the same server. This allows for persistent connections, but may have problems if an excessive number of users originates from the same domain name or IP address, as could be the case with very large Internet providers such as aol.com and other mega proxy sites.

Round robin distributes client requests evenly across the server group. The first client connection should be sent to the first server, the second to the second server, and so on until each server has a connection. Then the next connection should be sent to the first server, etc. This policy is the simplest way of balancing web traffic, and is best suited for environments where all the servers have about the same performance level and all serve the same content.

Weighted round robin is similar to round robin, but applies a static weight to each server. The weight is set during configuration. For example, if server X has a weight of two, and server Y has a weight of one, then server X will receive two connections for each connection given to server Y. This scheduling policy can be very useful if all servers are serving the same content, but some servers are faster than others.

Utilization percentage distributes client requests based on utilization of the servers available in the server group (defined by current connections divided by the maximum number of connections). This policy allows for very granular control over the number of connections dispatched to each server.

Least connections distributes client requests based on the server with the least connections currently open.

Weighted least connections distributes client requests based on the number of connections currently open and a static weight assigned to each server. The weight is assigned during configuration. For example, the weight is based on the processing speed or connection bandwidth of the server. Connections are then distributed using the servers with the least open connections by weight. This scheduling policy has the advantage of not overloading older, slower servers with too many connections.

Priority scheduling distributes client requests by static priorities assigned to each server in the server group. The priorities are assigned during configuration.

The persistence policies include self-identification stickiness, cookie hashing stickiness, client-based persistence, cookie-ID based persistence, and session-ID based persistence. (In the foregoing, "ID" is shorthand for "identifier".).

For self-identification stickiness, the content analysis engine (38 in FIG. 1) extracts a server ID from cookie information. In particular, the cookie value following a matched cookie name and the "=" character is found to be a server IP/MAC address. The policy engine (40 in FIG. 1) selects the server having the extracted server IP/MAC address to service the client request if this server is available.

For cookie hashing stickiness, the content analysis engine (38 in FIG. 1) extracts server-related information from cookie data and uses the information to calculate a hash value. In particular, the cookie value following a matched cookie name and "=" character is found to be server-related information. If this value is presented, and the same service is requested, then the policy engine (40 in FIG. 1) selects the server pointed to by the hash value if this server is available. In particular, the policy engine uses the hash value to get a server ID by looking up a super group and a basic group, which are further described below.

Client-based persistence uses the client IP address to direct the client connection to the server that the client connected to previously. Since the client IP address can change, it is preferred to use another persistence feature when possible.

Cookie-ID based persistence uses cookie information stored by the client to direct the client connection to the server that issued the cookie.

Session-ID based persistence derives a session ID from the packet or packets which spawned the request for service, and used this session ID to direct the client connection to a server.

Figure 6:
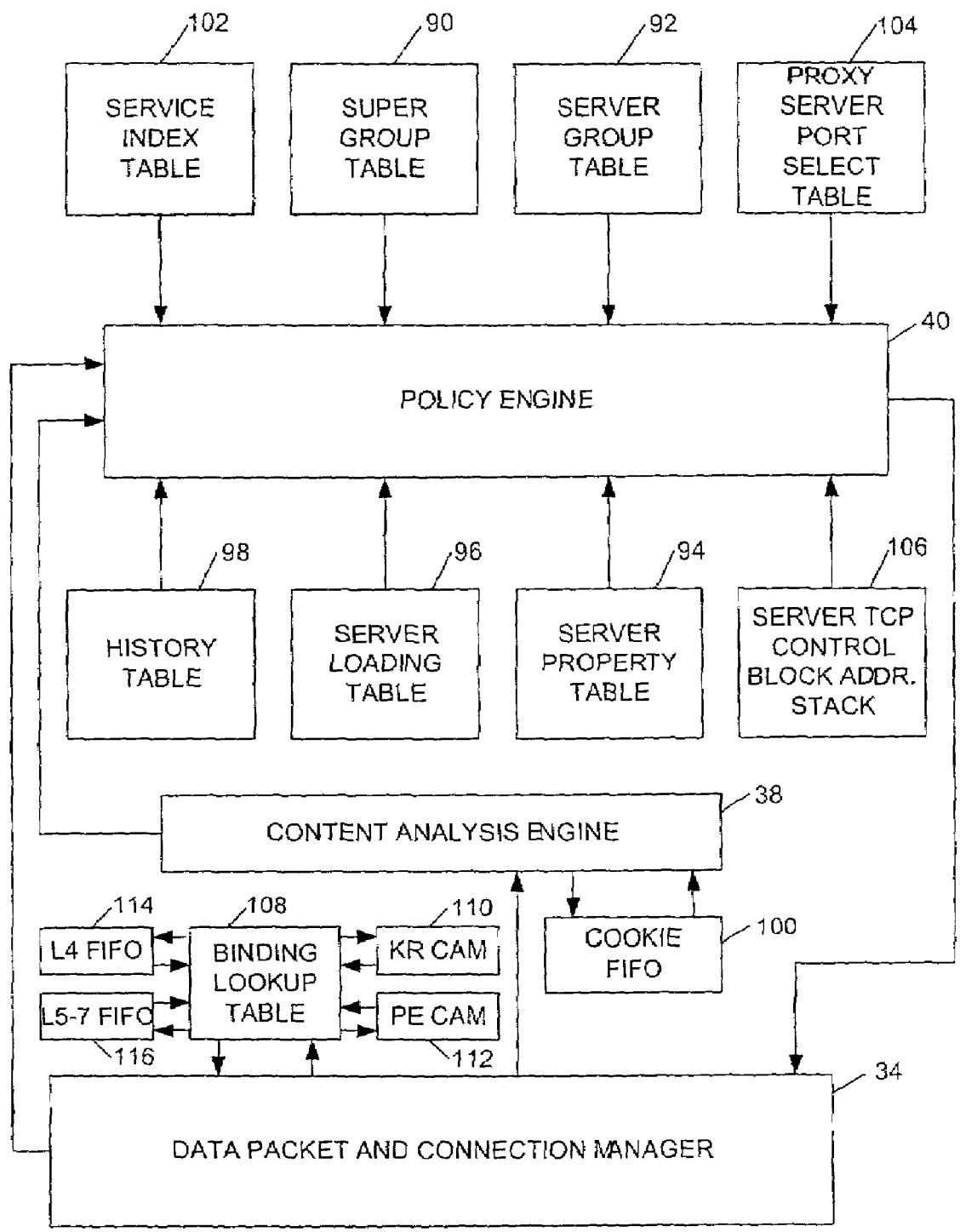
FIG. 6 is block diagram showing one embodiment of the policy engine introduced in FIG. 1, and various functional blocks used with the policy engine.

FIG. 6 shows various functional blocks used with one embodiment of policy engine 40. In order to select a server for servicing each client request, the servers are arranged in a hierarchy including groups of servers, and super groups of the groups of servers. In this fashion, the servers are configured into overlappable, arbitrary subsets that match configured content rules. Information about the super groups is stored in a super group table 90, and information about the server groups is stored in a server group table 92. Each server within a given server group is capable of responding to a given service request type, as is each of the servers within the corresponding super group. This architecture allows great flexibility while requiring relatively small amounts of memory for the server group and super group tables. The static properties such as bandwidth, maximum number of requests supported, etc., of each server are stored in a server property table 94, and the dynamic properties including current loading of each server is stored in a current server loading table 96. Real-time state kept for the policy engine 40 includes a history table 98, which stores a history of bindings of the client identifiers to the selected servers for various service request classes. The history information in the history table 98 is supplemented by cookie information in a cookie FIFO buffer 100 associated with content analysis engine 38. Cookie FIFO buffer 100 stores cookie information that is accessed by content analysis engine 38 to implement the self-identification stickiness and cookie hashing stickiness policies as described above. In one implementation example, cookie FIFO buffer 100 is a 512×64 bit dual-port FIFO.

As introduced in FIG. 5, the application of the pattern rules by the content analysis engine 38 results in each connection being assigned a particular service having a pre-assigned server super-group and scheduling policy. Each service is identified by a service index. A service index table 102 is configured to contain a server super group address and a load balancing policy for each service index. The policy engine 40 selects a server group within the assigned server super-group, and then applies the policy in view of the static and loading characteristics of the candidate servers to select a server to handle the client request, and to route the client request to the selected server. For routing of the client request, the policy engine 40 accesses a proxy server port select table 104 organized as a FIFO buffer of assigned IP addresses and ports of the proxy server load balancer 20, and a server TCP control block address stack 106 organized as a FIFO buffer of addresses of corresponding server TCP control blocks.

The TCB control blocks and related information about the TCP connections for the client requests is maintained by a binding lookup table 108 associated with the data packet and connection manager 34. The binding lookup table 108 maintains a list of open connections in a content addressable memory (KR CAM) 110. The key to the KR CAM 110 is a 5 tuple (source IP address, destination IP address, source port, destination port, protocol) extracted from incoming IP data packets. The contents of the KR CAM are pointers, each of which points to a respective binding lookup table data structure (TCB), which describes the state of a connection. The TCB data structure has one format for L4 connections and another format for L5-7 connections. As data packets are received by the data packet and connection manager 34 from the data link interface 24 in FIG. 1, the data packets are examined by the binding lookup table 108. If a packet refers to an existing connection, and L4 service is desired, then the binding lookup table 108 will find a corresponding entry in the KR CAM 110, and will return the KR CAM pointer of the TCB to the data packet and connection manager 34, so that the corresponding TCB can be accessed during handling of the packet.

If the data packet passed from the data link interface 24 to the data packet and connection manager 34 is associated with a new connection, then there will be no corresponding entry in the KR CAM 110. In this case the binding lookup table references a content addressable memory (PE CAM) 112 with a 3 tuple (destination IP address, destination port, protocol) to determine whether this new connection can be supported by the proxy server load balancer 20, whether the connection is requesting an L4 (non content aware) or L5-7 (content aware) service, and which particular service is being requested. If the client is requesting a supported service, then the binding lookup table 108 obtains a new pointer to an L4 or L5-7 TCB from an L4 free-pointer FIFO 114 or an L5-7 free-pointer FIFO 116, and sends the new pointer to the data packet and connection manager 34.

In the case of a new L4 connection, the data packet and connection manager 34 sends information about the requested service to the policy engine 40. This information is included in an L4 service request to the policy engine 40. In the case of a new L5-7 connection, the data packet and connection manager 34 sends information about the requested service to the content analysis engine 38. The content analysis engine 38 analyzes the content of the data packet to extract additional information pertaining to the requested service, and formulates an L5-7 service request sent to the policy engine 40.

When a connection is terminated, the data packet and connection manager 34 returns the corresponding TCB pointer to the binding lookup table 108, and the binding lookup table 108 removes the corresponding KR CAM entry, and places the TCB pointer on the L4 or L5-7 free-pointer FIFO.

The policy engine 40 receives the L4 service requests from the data packet and connection manager 34 and the L5-7 service requests from the content analysis engine 38. The policy engine 40 binds each service request to a specific server, assigns a proxy server load balancer IP address and port, and returns the server, IP address, and port assignments to the data packet and connection manager 34 so that the data packet and connection manager 34 may reformat the client request and forward the client request to the selected server. The policy engine 40 supports both LA and L5-7 transactions through the same mechanism, and, in one implementation example, can handle a peak capacity of 1.5 million transactions per second. Each service can be assigned any number of up to 65,536 (i.e., 64K) total servers and may share servers with other services. Each server can belong to any number of services because server loadings are global and not linked to a specific service.

In one implementation, the policy engine 40 receives the L4 and L5-7 service requests as service index pointers uniquely specifying one of 64K available L4 services or 4 million minus 64K available L5-7 services. The policy engine 40 gives priority to the LA service requests so that the data packet and connection manager 34 need not provide any data storage for Layer 4 data. (The data packet and connection manager 34 provides data storage for Layer 5-7 data.) The policy engine uses the service index to index the super group table 90, which contains pointers for a group of server groups that belong to the same service. The pointers from the super group table 90 index into server group table 92 to determine what servers are available to service the request. A load balancing policy, received as part of the service request, and any persistence policy, as provided by the history table 98, are then enforced to determine which of the available servers is chosen and in what manner this decision is made. In the event that a cookie (L5-7 only) is present or client ID is present (client IP address for L4 and session ID for L5-7) and the persistence policy forces the request to a specific server, the service index table 102 and the server group table 92 are bypassed and a server ID is retrieved from the history table 98. In one implementation, each policy is enforceable within sufficient time to allow 1.5 million L4 and 300,000 L5-7 transactions per second. The next available proxy server port is then popped off the proxy server port select table 104 and used to dispatch the request. In the case of a layer 5-7 transaction, a next available server TCB address pointer is popped from the server TCB control block address stack 106. (For an L4 transaction, the data packet and connection manager 34 maintains a Server TCB address.)

Figure 7:
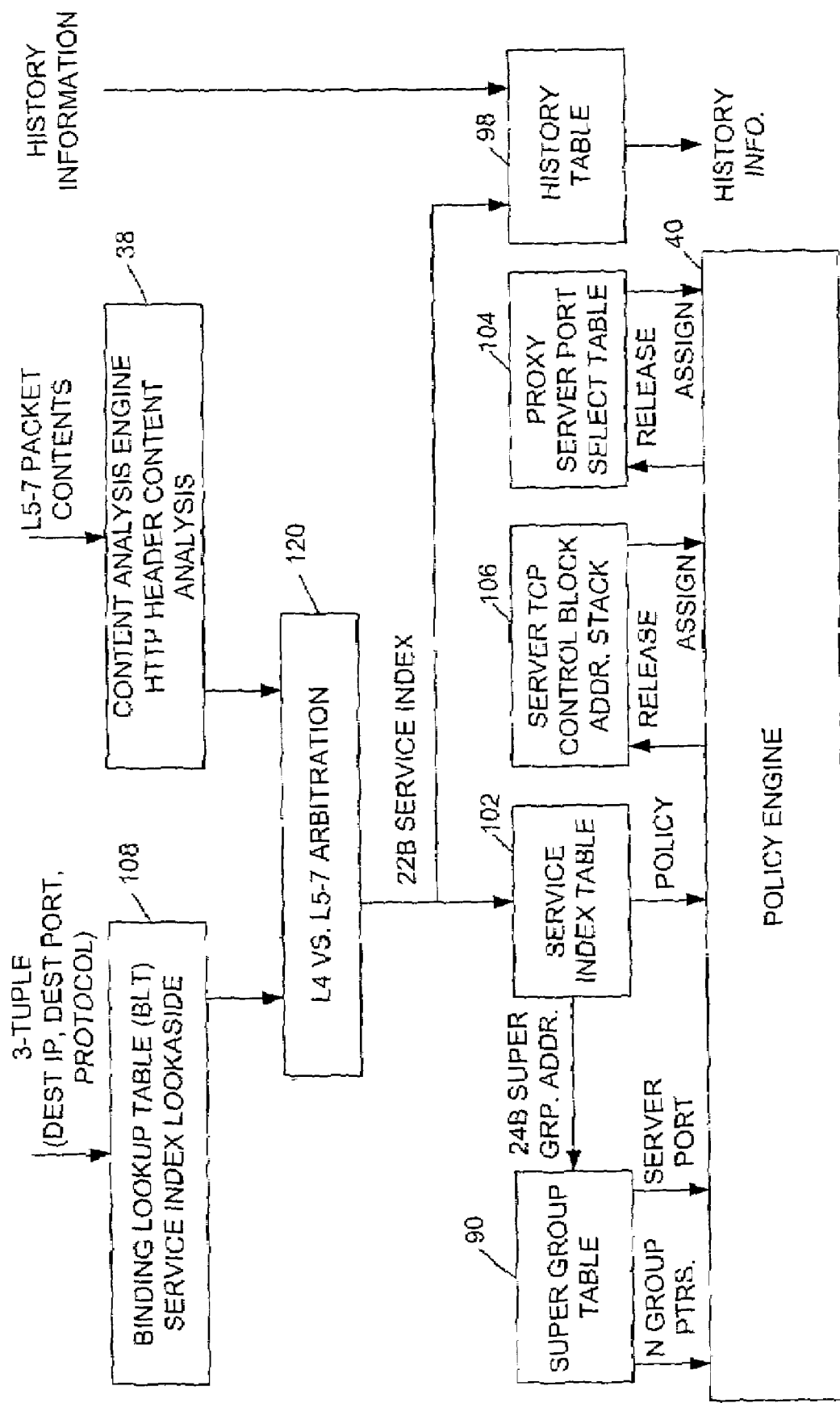
FIG. 7 is a first sheet of a flow diagram showing the processing of information by one embodiment of the policy engine.
Figure 8:
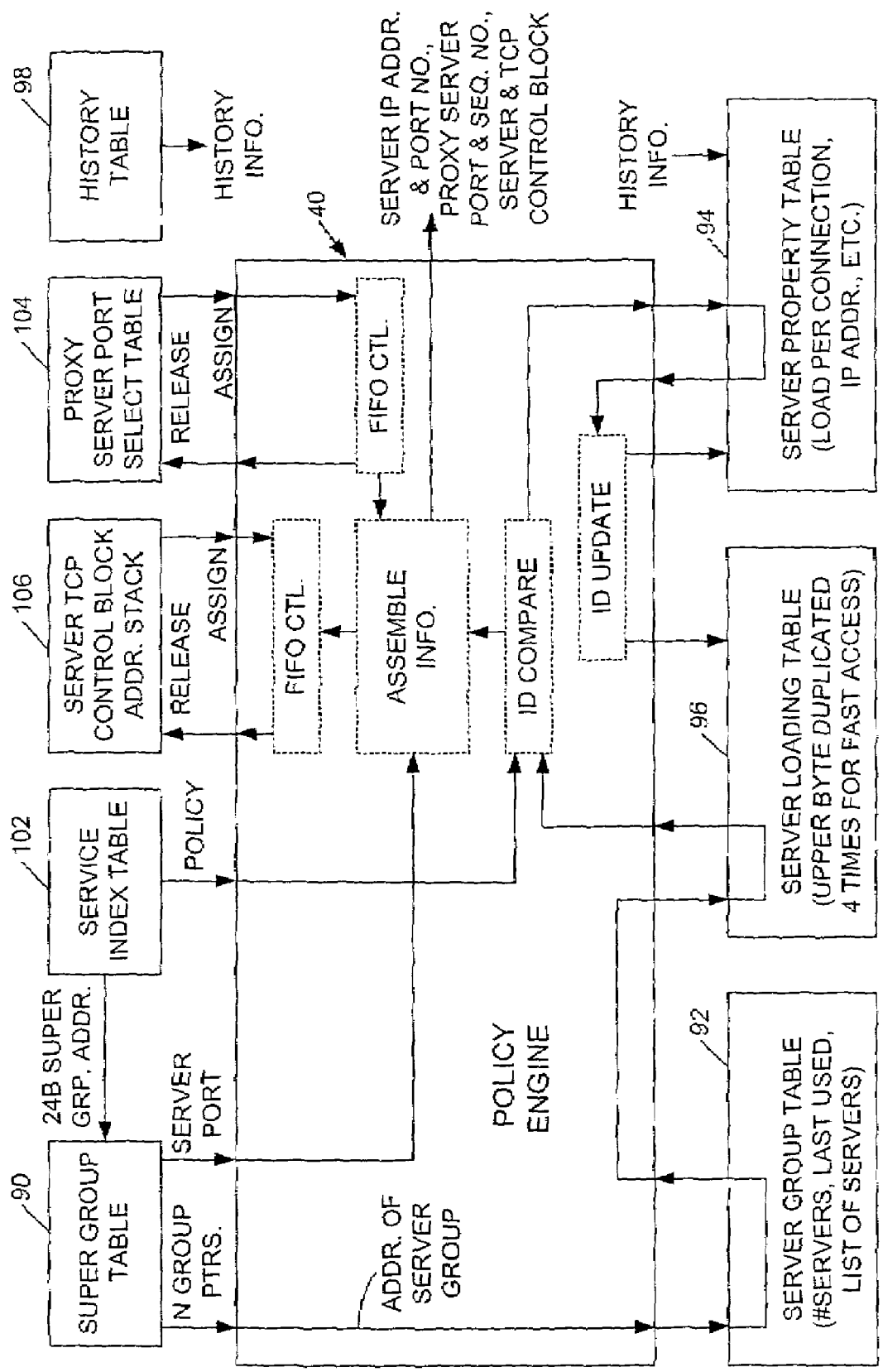
FIG. 8 is a second sheet of the flow diagram begun in FIG. 7.

FIGS. 7 and 8 further show the data flow when the policy engine 40 processes a service request. A service request originates from the binding lookup table 108 being accessed by a 3-tuple (destination IP address, destination port, and protocol) for an L4 request, or from the content analysis engine 38 analyzing the HTTP header of a data packet for an L5-7 request. The policy engine 40 is also responsive to a service delete for both an L4 or L5-7 connection close. If both an L4 or L5-7 request occur concurrently, in one embodiment, the policy engine 40 performs arbitration 120 and gives priority to the L4 request. In one implementation, both L4 and L5-7 requests provide a 22 bit service index to the policy engine 40 which uses this service index to index the service index table (102 in FIG. 8).

If a persistence policy is not applicable, then a load balancing policy is employed. Persistence attempts to force the client request to the server that handled the last request from the same client. Stickiness for an L4 request is based on the client identity. For an L5-7 request, cookie-ID based or session-ID based stickiness is attempted. System administrators may attach server identifiers in their cookies. Therefore, implementation of cookie-ID based stickiness may first be attempted based on any server identifier embedded in a cookie. However, if a server identifier is not found in the cookie, then an attempt may be made to apply a stickiness policy based on hashing of other information in the cookie.

Providing an exhaustive memory for the possibility of all 4 million services using all 64K servers would require half a terabyte of storage. The super group table 90 and the server group table (92 in FIG. 8) provide a means of packing the server grouping information by assigning each service a direct memory index into the super group table 90 and a policy code indicating the load balancing policy. In one embodiment, the super group table 90 contains a count of the number of server groups and the physical address pointer to each group of servers in the server group table 92. In one embodiment, the server group table 92 contains a count of the number of servers assigned to that server group and a list of server indices which index to the current server loading table 96 and server property table 94.

Server information, including loading, the maximum connection count, and the associated IP address, is maintained in the server loading table 96. Server loadings are read as soon as the server identifiers arrive from the server group table 92. In one embodiment, the server loading table 96 is organized such that server loadings are available in groups of four to match the bandwidth of the server group table 92. After a server is chosen, the corresponding loading is updated when appropriate.

Each entry in the server loading table 96 may also include one or more flags indicating the "health" of the corresponding server indicating, for example, whether the server is unavailable due to a catastrophic failure, or failure to pass a prescribed health check. The policy engine 40 may access these one or more flags, and avoid allocating the corresponding server to a request if the flags indicate a failure or unhealthy condition.

In one embodiment, the final output from policy engine 40 to the data packet and connection manager 34 is the IP address and port number of the selected server, the proxy server load balancer IP address and port number assigned to handle the client request, a source Initial Sequence Number (ISN), and the TCP control block address pointer associated with the transaction. In one embodiment, the policy engine 40 generates a new Initial Sequence Number by adding 32K value to the previous ISN every time a new binding is sent for an L5-7 service request. (For an L4 service request, the data packet and connection manager 34 just forwards the Initial Sequence Number between the servers and clients).

Figure 9:
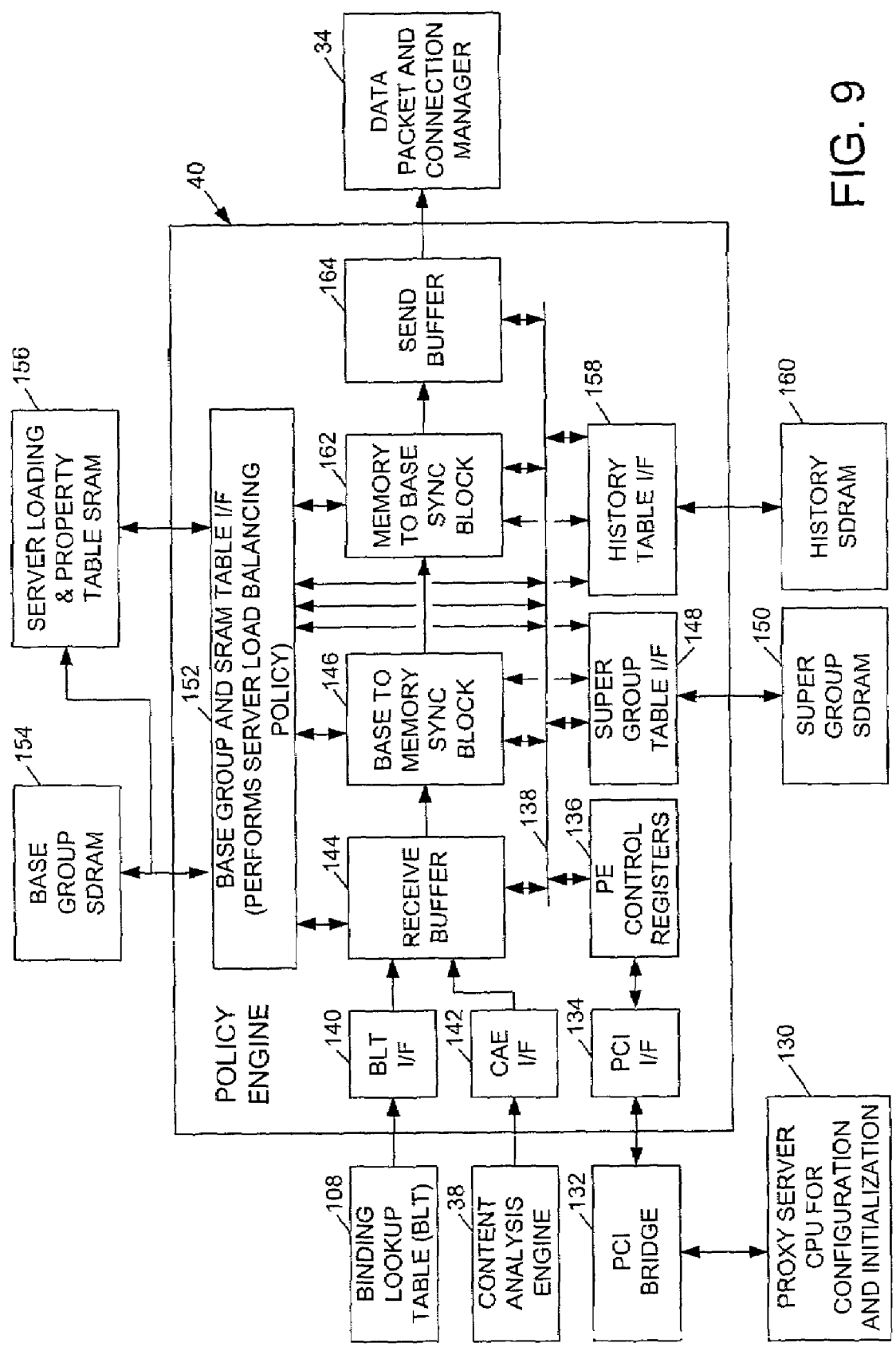
FIG. 9 is a block diagram showing various functional blocks within one embodiment of the policy engine.

FIG. 9 shows various functional blocks within one implementation of the policy engine 40. The policy engine 40, and other state machines and tables in the proxy server load balancer, are configured and initialized at "boot time" by a central processing unit (CPU) 130 in the proxy server load balancer. This CPU 130 is interfaced to the state machines by a PCI bridge 132. The policy engine 40, for example, includes a PCI interface (I/F) 134 linking the PCI bridge to a set of policy engine control registers 136. The policy engine control registers 136 in turn are linked via a control bus 138 in policy engine 40 to various functional blocks and memory interfaces in the policy engine. Therefore the CPU 130 can configure and initialize the policy engine 40 and the memory interfaced to the policy engine by writing data to the policy engine control registers 136.

The L4 and L5-7 requests are pipelined through functional blocks in the policy engine 40, causing parallel and pipelined operations in the various memories interfaced to the policy engine. The L4 requests from the binding lookup table (BLT) 108 are received in a BLT interface 140, and the L5-7 requests from the content analysis engine (CAE) 38 are received in a CAE interface 142. The L4 and L5-7 requests pass from the BLT and CAE interfaces to a receive buffer 144, which gives priority to the L4 request in the BLT interface if both the BLT interface and the CAE interface contain requests. The receive buffer 144 also handles the scheduling for sending data to various other functional blocks such as the memory interfaces and the other blocks down the control pipeline from the receive buffer.

Requests from the receive buffer 144 pass a base-to-memory synchronization block 146, which is linked to a super group table interface 148 to initiate access of super group SDRAM 150 and is linked to a base group and SRAM table interface 152 to initiate access of server group or base group SDRAM 154 and server loading and property table SRAM 156. The base-to-memory synchronization block 146 includes a number of mailboxes and asynchronous FIFOs that send data from the base clock domain of the policy engine to memory clock domain of the memory interfaces. These mailboxes and asynchronous FIFOs are controlled by the receive buffer 144. The super group table interface 148 includes a memory controller for the super group SDRAM 150 and arbitrates between various tables that reside inside the super group SDRAM (namely, the service index table 102, the super group table 90, the proxy server port select table 104, and the server TCP control block address stack 106 as introduced in FIG. 6.) The base group and SRAM table interface 152 includes a memory controller for the base group SDRAM 154 and a memory controller for the server loading and property table SRAM 156. The base group and SRAM table interface 152 also performs any server load balancing policy applicable to each L4 or L5-7 request.

The requests are pipelined from the base-to-memory synchronization block 146 to a memory-to-base synchronization block 162, which controls assembly of information from the memories. In particular, information from the base group SDRAM 154 and the server loading and property table SRAM 156 flows to memory-to-base synchronization block 162 via the base group and SRAM table interface 152, and information from history table SDRAM 160 flows to the memory-to-base synchronization block 162 via a history table interface 158. The memory-to-base synchronization block 162 includes a number of mailboxes and asynchronous FIFOs that send data from the memory clock domain of the memory interfaces to the base clock domain of the policy engine 40. The history table interface 158 includes a memory controller for access to the history table SDRAM 160, and also arbitrates between different kinds of history table access including history seek write, history seek read, delete, and history crawling. The history table SDRAM 160 includes client IP based history entries, cookie based history entries, and session based history entries. The information assembled by the memory-to-base synchronization block 162 passes through a send buffer 164 to the data packet and connection manager 34. The send buffer 164 also controls the mailboxes and asynchronous FIFOs in the memory-to-base synchronization block 162.

Embodiments of the Invention

Figure 10A:
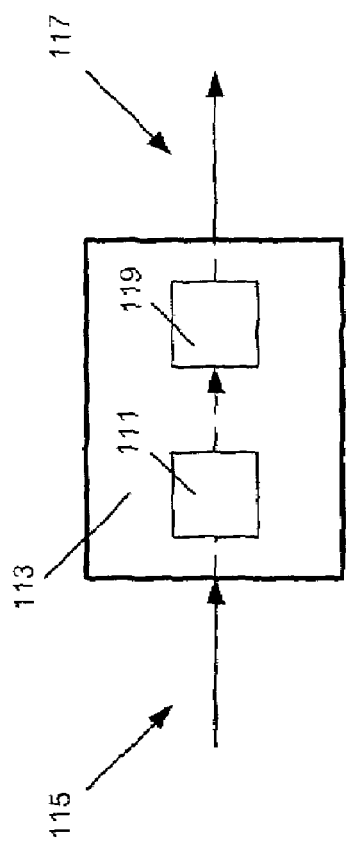
FIG. 10A is a simplified block diagram of a first embodiment of a system according to the invention in which a policy is assigned to a service request responsive to a category of service specified by the service request, and the policy is used to allocate a resource to the request.

Referring to FIG. 10A, a first embodiment of a system 113 for allocating a resource to a request 115 for a category of service selected from amongst a plurality of possible categories is illustrated. First logic 111 selects, responsive to the selected category of service, a policy from amongst a plurality of possible policies. Second logic 119 applies the selected policy to allocate, through one or more signal lines 117, a resource to the request.

For purposes of this disclosure, the term "logic" refers to hardware, software, or a combination of hardware and software. As utilized herein, terms such as "about" and "substantially" are intended to allow some leeway in mathematical exactness to account for tolerances that are acceptable in the trade, e.g., any deviation upward or downward from the value modified by "about" or "substantially" by any value in the range(s) from 1% to 20% of such value.

In one embodiment, the resource is a server, and the policies which are possible comprise server load balancing policies. Some examples of the server load balancing policies which are possible in this embodiment are as follows:

| Policy | Description |
| --- | --- |
| Round Robin (RR) | A server is allocated by evenly distributing requests amongst a group of servers. |
| Weighted Round Robin (WRR) | A server is allocated by distributing requests amongst a group of servers in proportion to static weights assigned to each of the servers. |
| Utilization Percentage (UP) | A server in a group which has the least utilization percentage (current loading/maximum loading × 100%) is allocated to a request. |
| Least Connection (LS) | A server in a group with the least number of connections is allocated to a request. |
| Weighted Least Connection (WLS) | Each server in a group is assigned a static weighting, and a server in the group with the weighted least number of connection is allocated to a request. |
| Priority (PS) | A server in a group with the highest priority as set by at system configuration time is allocated to a request. |

Figure 10B:
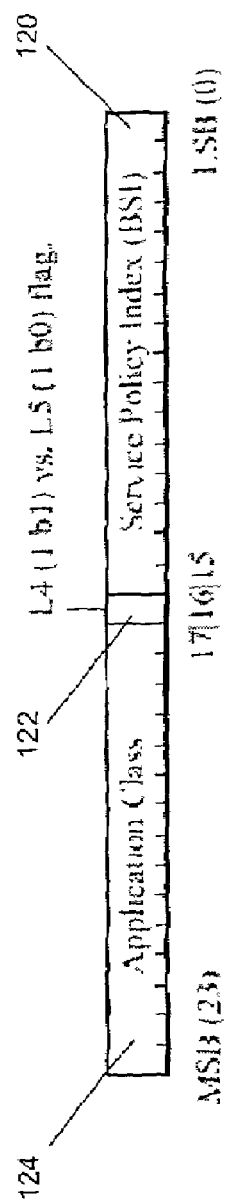
FIG. 10B illustrates one example format of a PE CAM entry.

In one implementation, a service request is in the form of a packet and a PE CAM entry, which may have the format illustrated in FIG. 10B, is derived from the packet. The lower 16 bits, identified with numeral 120, represents a Base Service Policy Index (BSI), and, in combination with the application class, discussed infra, is representative of the type of service which is desired for the packet. The settings of this field are application dependent, but some examples of possible services which may be indicated by this field are whether or not the connection is to be SSL-terminated or not, whether the quality of service (QOS) is to be high or low, if the desired service is a layer 5-7 service, the specific layer beyond layer 5 which is involved, the Internet service provider (ISP) to be associated with the connection, e.g., AOL, AKAMAI, YAHOO, CNN, and whether the connection or ISP is to be associated with a high or low level or priority.

Bit 16, identified with numeral 122, indicates whether the service is a layer 4 or layer 5-7 service. As discussed, the layer 4 category of service is content-independent or content-disabled, and the layer 5-7 category of service is content-enabled.

The upper 7 bits, identified with numeral 124, indicate an application class associated with the request. Again, the settings in this field are application dependent, but some examples of settings which are possible for this field, include whether the connection relates to .gif files, text files, etc.

Figure 10C:
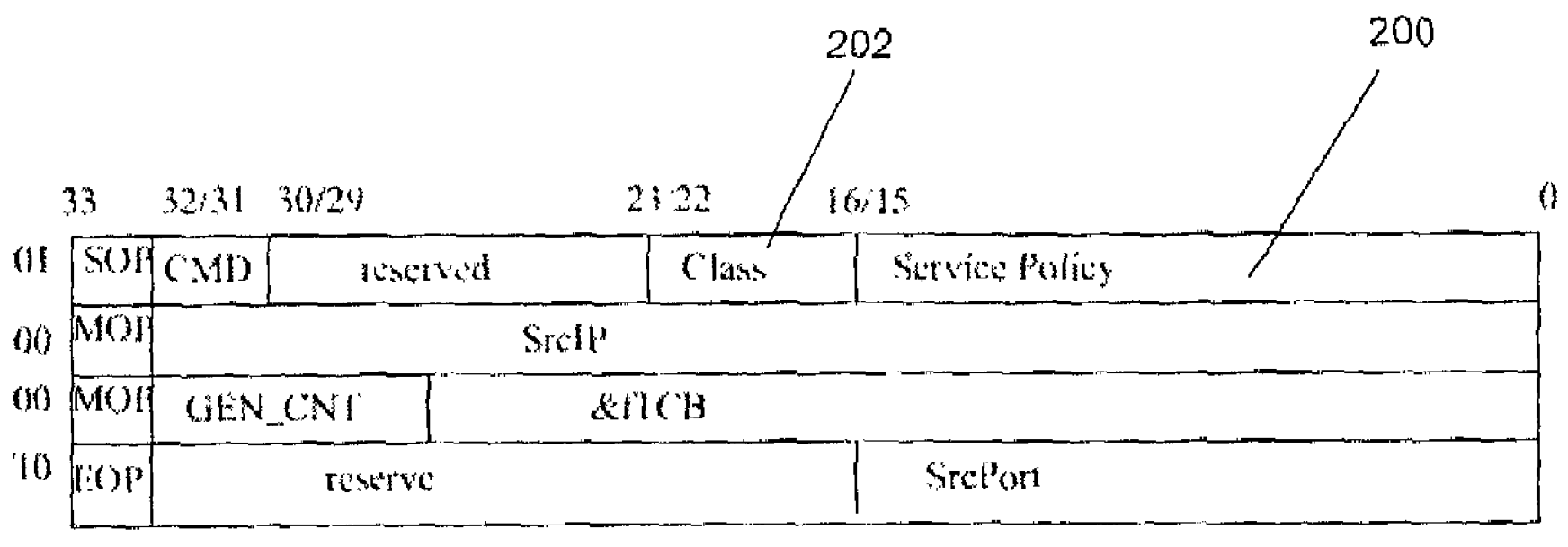

In one implementation, for a layer 4 packet, binding lookup table 108 forwards a service request to the policy engine 40 using information derived from the PE CAM entry illustrated in FIG. 10B. In one example, the request may have the format illustrated in FIG. 10C. In this figure, field 200 is the BSI and is derived from field 120 in the PE CAM entry, and field 202 is the application class, and is derived from the field 124 in the PE CAM entry.

In this implementation, for a layer 5-7 packet, content analysis engine 38 forwards a service request to the policy engine using information derived from an analysis of the content of a data grouping encapsulating the packet. In one example, the request may have the format illustrated in FIG. 10D. In this figure, field 204 is the Content Service Policy Index (CSI) determined by the content analysis engine 38. This field is representative of the type of service which is requested for the packet.

Figure 11:
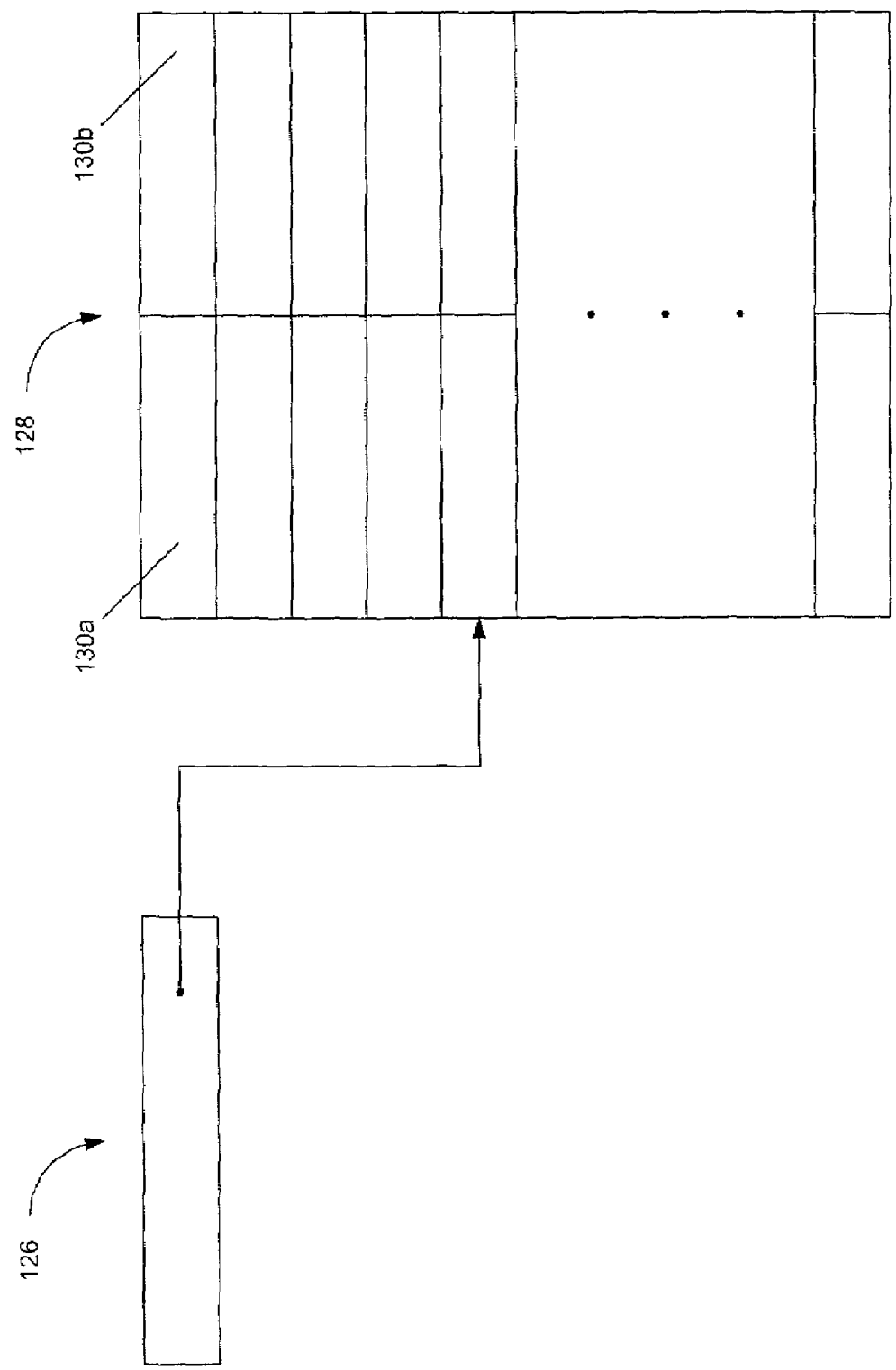
FIG. 11 is a simplified block diagram illustrating an implementation of the first embodiment of a system according to the invention in which a category of service specified by a service request is used as an index to a data structure to determine a policy to be applied in allocating a resource to the service request.

In one implementation, illustrated in FIG. 11, one or more fields from a service request, identified with numeral 126, form an index to a table, identified with numeral 128. In one example, referring to FIG. 10, the Service Policy Index field 120 and the Application Class field 124 may be combined to form an index to the table 128. Referring back to FIG. 11, the index, once determined, is used to access an entry in the table. As illustrated, in this particular implementation, each entry in the table 128 has two parts. A first part, identified with numeral 130a, contains information from which is derived a group of one or more candidate servers for potentially allocating to the request. A second part, identified with numeral 130b, identifies a policy to be applied to the candidate group of servers to determine a specific server to allocate to the request.

In one implementation, in response to a service request, these two parts of the entry are accessed. The first part is used to determine one or more servers which are candidates for allocating to the request. The second part is used to determine a load balancing policy from a group of possible load balancing policies. The selected load balancing policy is then applied to the candidate list of servers to determine a specific server to allocate to the request.

Figures 12A, 12B:
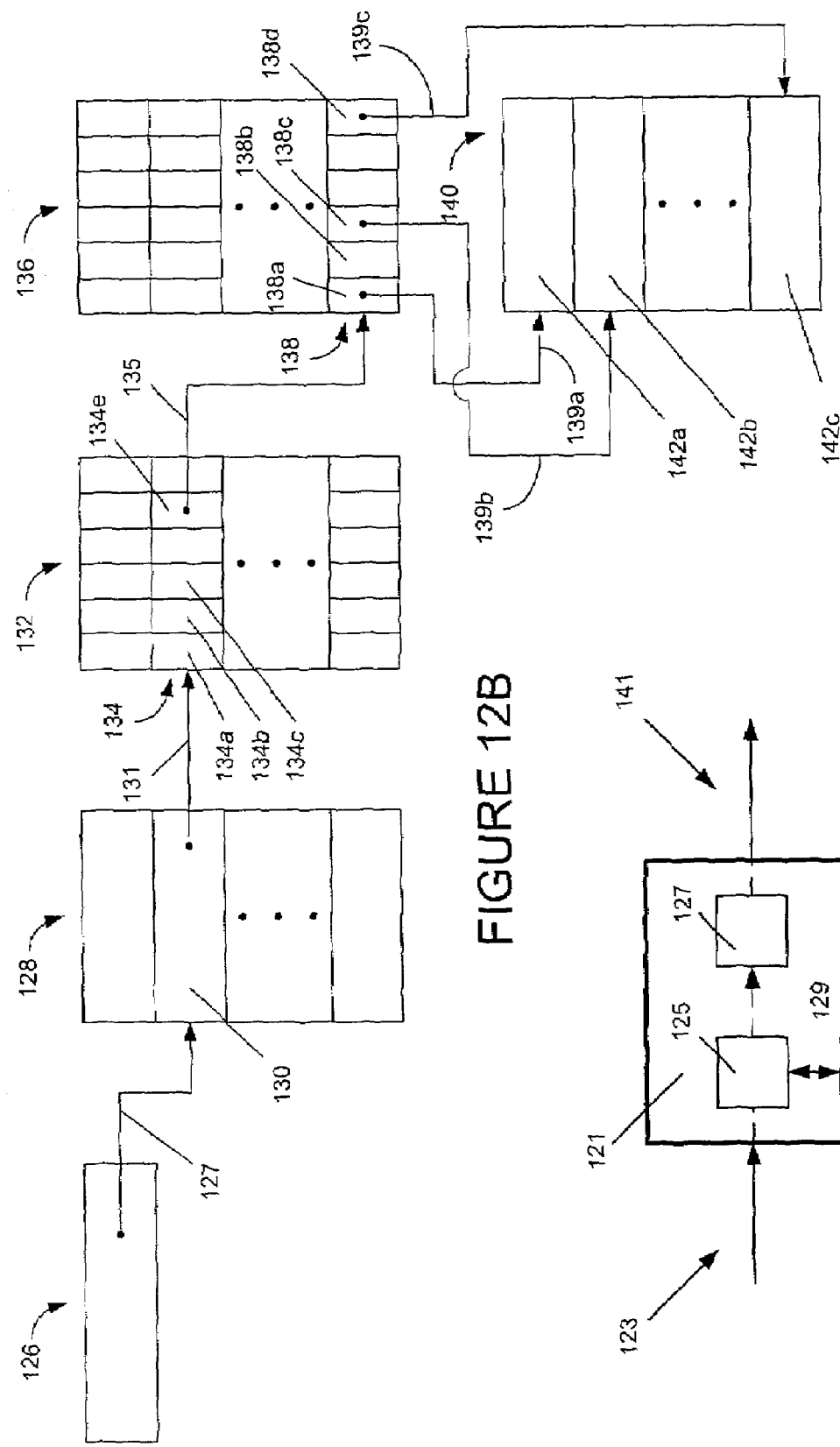
FIG. 12A is a simplified block diagram illustrating a second embodiment of a system according to the invention in which a resource is allocated to a service request using a hierarchical arrangement of data structures, the hierarchical arrangement having a plurality of levels.
FIG. 12B is a simplified block diagram illustrating one implementation of a second embodiment of a system according to the invention in which a server is allocated to a service request using a hierarchical arrangement of tables where an index derived from a table entry on one level is used to access a table entry on the next level.

Referring to FIG. 12A, a second embodiment of a system 121 according to the invention for allocating a resource to a service request 123 is illustrated. As illustrated, in this embodiment, the system comprises first logic 125, which uses a multi-level hierarchical arrangement of data structures 129 to identify one or more candidate resources for allocating to the request 125, and second logic 127 for selecting one of these candidate resources and allocating it to the request 123 through one or more signal lines 141.

In one implementation, the data structures are indexed. A first index derived from the service request is used to access an entry from a root data structure in the hierarchy. A second index derived from the entry in the root data structure is used to access an entry in the data structure at the next level of the hierarchy. This process may continue one or more times until the data structure at a terminal level of the hierarchy is reached. At this point, one or more entries in the terminal data structure are accessed to determine one or more candidate resources. One of the candidate resources is selected and allocated to the request.

In one implementation, each of the data structures in the hierarchical arrangement is an indexed table. Referring to FIG. 12, in one example of this implementation, at least three such tables are in the hierarchy, and comprise service index table 128, super-group table 132, and server group table 136. A service request, identified in FIG. 12 with numeral 126, represents a service request. An index to the service index table, identified with numeral 127, is derived from the service request. This index yields an entry 130 in the service index table, which represents a server super-group allocated to the request.

An index 131 to the super-group table 132 is derived from the entry 130 in the service index table. This index 131 yields an entry 134 in the super-group table which represents one or more server groups 134a, 134b, 134c in the super-group allocated to the request. One of these server groups, identified with numeral 134e, is identified and allocated to the request. In one example, a prescribed load balancing policy, such as round-robin, is applied to these server groups 134a, 134b, 134c to identify the specific server group 134e to allocate to the request.

An index 135 to the server group table 136 is derived from the specific server group 134e allocated to the request. This index 135 yields an entry 138 in the server group table 136 which represents one or more servers 138a, 138b, 138c in the server group 134e which are candidates for allocating to the request. One of these candidate servers is selected and allocated to the request. In one example, the server is selected from amongst a plurality of candidate servers through application of a suitable load balancing policy, examples of which were provided earlier.

In one implementation example, loading information for the candidate servers is maintained in a server loading table 140. In this example, indices 139a, 139b, 139c to the server loading table 140 are derived from the list of candidate servers 138a, 138b, 138c. These indices are used to access corresponding entries 142a, 142b, 142c in the server loading table 140. Through this mechanism, loading information for the candidate servers 138a, 138b, 138c is obtained through one or more accesses to the server loading table 140. One of the candidate servers is then selected by applying a suitable load balancing policy to the loading information obtained from the server loading table 140. This server is then allocated to the request, and the loading information for that server updated in the server loading table 140.

Figure 13:
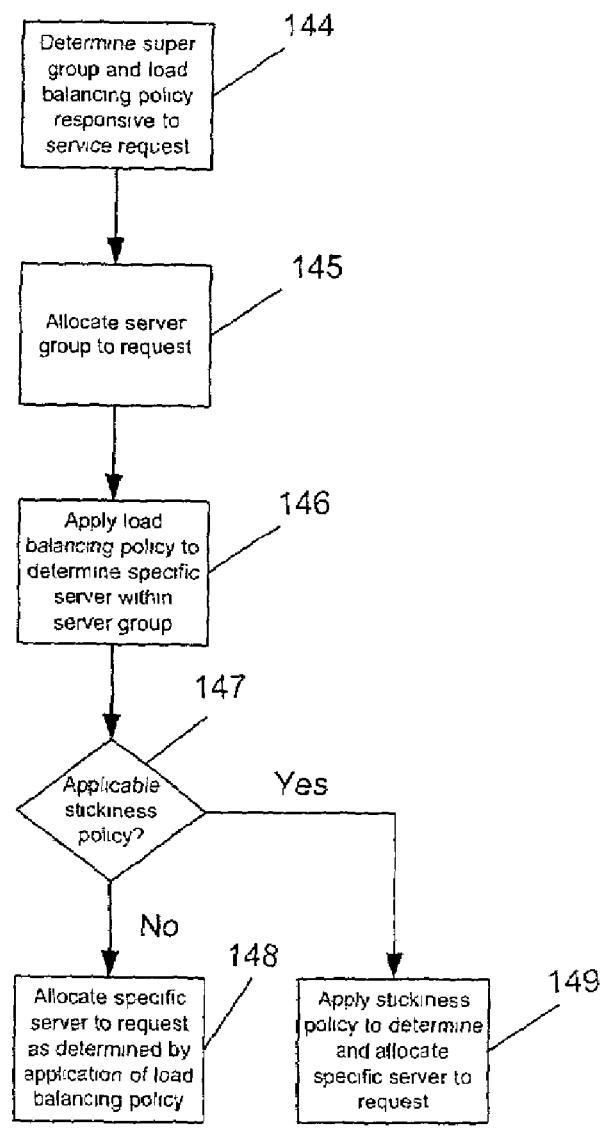
FIG. 13 is a flowchart illustrating one embodiment of a method according to the invention in which application of a stickiness policy overrides application of a load balancing policy.

Referring to FIG. 13, a flowchart of an embodiment of a method of allocating a server in response to a resource request is illustrated. In this embodiment, the method begins with step 144, which comprises determining a super group and load balancing policy responsive to a service request. The service request may specify a requested class of service from amongst a plurality of possible categories, and the super group and load balancing policy may be determined in response to the specified class of service.

From step 144, the method proceeds to step 145, which comprises allocating a server group to the request from the one or more server groups which are members of the server super-group allocated to the request in step 144. This step may comprise applying a suitable load balancing policy, which may the same or different from the load balancing policy determined in step 144, to the one or more server groups in the server super-group.

From step 145, the method proceeds to step 146, which comprises applying the load balancing policy obtained from step 144 to the one or more servers which are members of the server group allocated in step 145. The result is a specific server within the server group for allocating to the request.

The method then proceeds to step 147. In step 147, an inquiry is made whether there is a server specified by an applicable stickiness policy for allocating to the request. If so, the method branches to step 149. If not, the method branches to step 148.

In step 148, the server allocated to the request in response to application of the load balancing policy in step 146 is allocated to the request. In step 149, the server determined through application of the stickiness policy referred to in step 147 is allocated to the request.

In this method, examples of the stickiness policies which may be applied include without limitation:

| Policy | Description |
| --- | --- |
| Self-identification Stickiness | For layer 5-7 requests only, the server ID will be extracted from cookie information, and assigned to the request. |
| Cookie Hashing Stickiness | For layer 5-7 requests only, a hash value will be derived from cookie information, and a hash algorithm translates this hash value into a server, which is assigned to the request if the same service is requested. |
| Client-Based Persistence | For layer 4 and layer 5-7 requests, the client IP address is used to determine the server the client was connected to before, and that server is allocated to the client. |
| Cookie-ID Based Persistence | For layer 5-7 requests only, cookie information stored by a client is analyzed to determine the server that issued the cookie, and that server is allocated to the client. |
| Session-ID Based Persistence | For layer 5-7 requests only, a session ID derived from the packet or packets which spawned the service request is analyzed to determine a server, and that server is allocated to the client. |

For purposes of this disclosure, and as used in the foregoing table, the terms "stickiness" and "persistence" are synonyms and can be used interchangeably. Similarly, the phrases "resource request" and "service request" are synonyms and can be used interchangeably.

Figure 14:
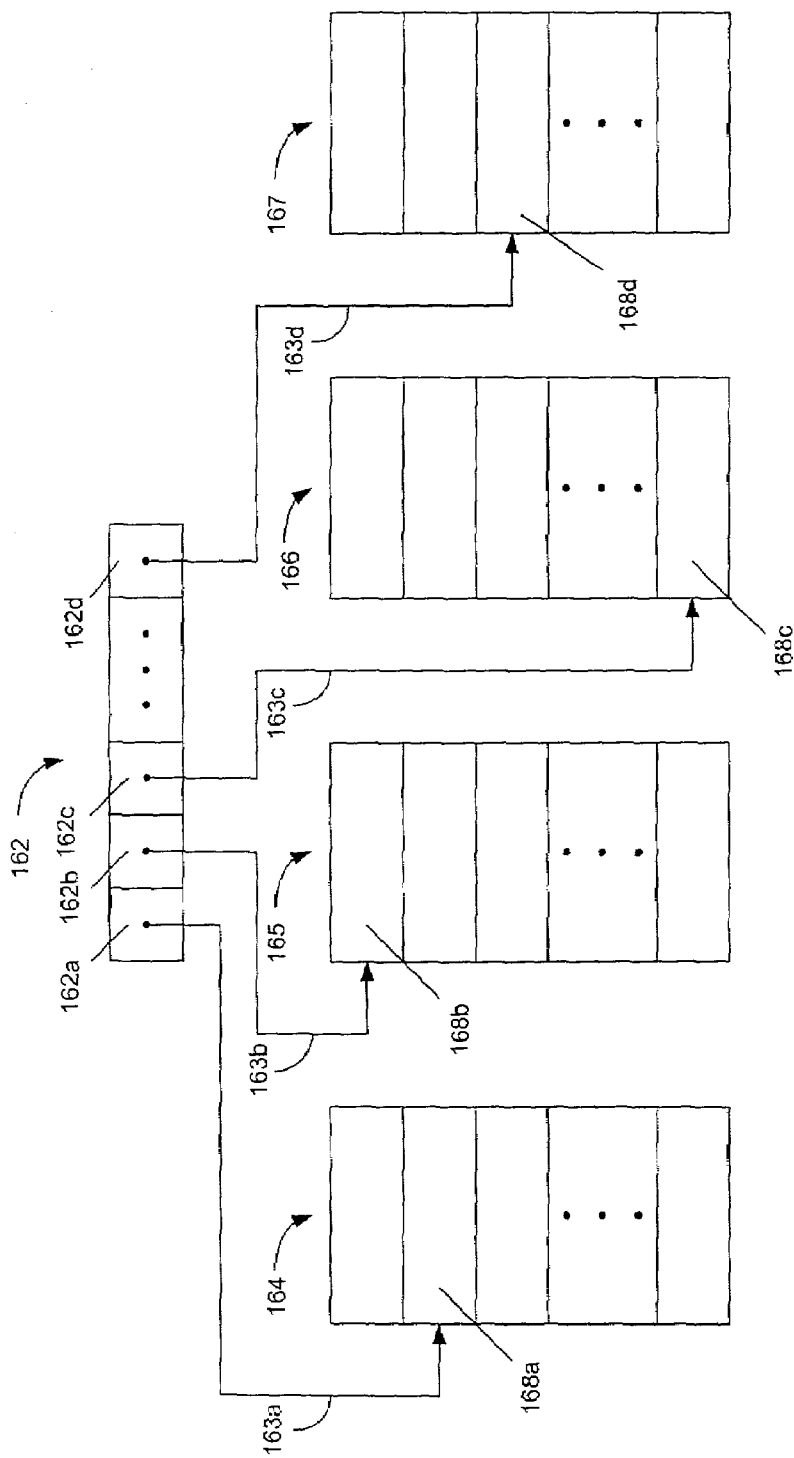
FIG. 14 is a simplified block diagram illustrating a third embodiment of a system according to the invention in which resource loading information is replicated across a plurality of memories to permit parallel accesses to this information.

A third embodiment of the invention comprises a system for accessing loading information for a plurality of resources which are candidates for allocating to a service request. Referring to FIG. 14, the one or more candidate resources may be specified by a data element 162 which, in one example, is an entry in a data structure such as a table. The one or more candidate resources may be represented by corresponding sub-portions 162*a*, 162*b*, 162*c*, 162*d* of the entry. The loading information for each of the candidate resources is replicated across a plurality of indexed data structures 164, 165, 166, and 167, each stored in one of a plurality of memories which are accessible in parallel. Indices 163*a*, 163*b*, 163*c*, and 163*d* for each of the candidate resources are derived from the corresponding portions 162*a*, 162*b*, 162*c*, and 162*d* of the data element 162, and used to perform parallel accesses to the data structures 164, 165, 166 and 167. As a result, loading information for each of the candidate resources 162*a*, 162*b*, 162*c*, and 162*d* may be obtained in parallel. One of the candidate resources is selected responsive to this loading information, and allocated to the request. In one implementation, this resource is selected by applying a suitable load balancing policy to the loading information for the one or more candidate resources.

Any of the foregoing systems may be implemented in hardware, software, or a combination of hardware and software, although, in one embodiment, the system is implemented in hardware or a combination of hardware and software in the form of one or more finite state machines. Moreover, any of the foregoing systems may be implemented as one or more engines, where an engine may be implemented in hardware or a combination of hardware and software. In one example, an engine is implemented in hardware as one or more finite state machines.

Moreover, method counterparts to each of the foregoing system are possible, and each such method may tangibly embodied in the form of digital logic, such as by way of example and not limitation, finite state machines implemented as FPGA arrays, ASICS, or the like, or in the form of a series of instructions stored on a processor readable medium, including without limitation, RAM, ROM, EPRPOM, PROM, EEPROM, disk, hard disk, floppy disk, CD-ROM, DVD, flash memory, etc.

For purposes of this disclosure, the term "memory" refers to any medium which is capable of storing data, and includes, without limitation, each of the examples of processor readable medium enumerated above.

It should also be appreciated that any combination of any two or more of the foregoing embodiments is possible.

Implementation Example

Figure 15:
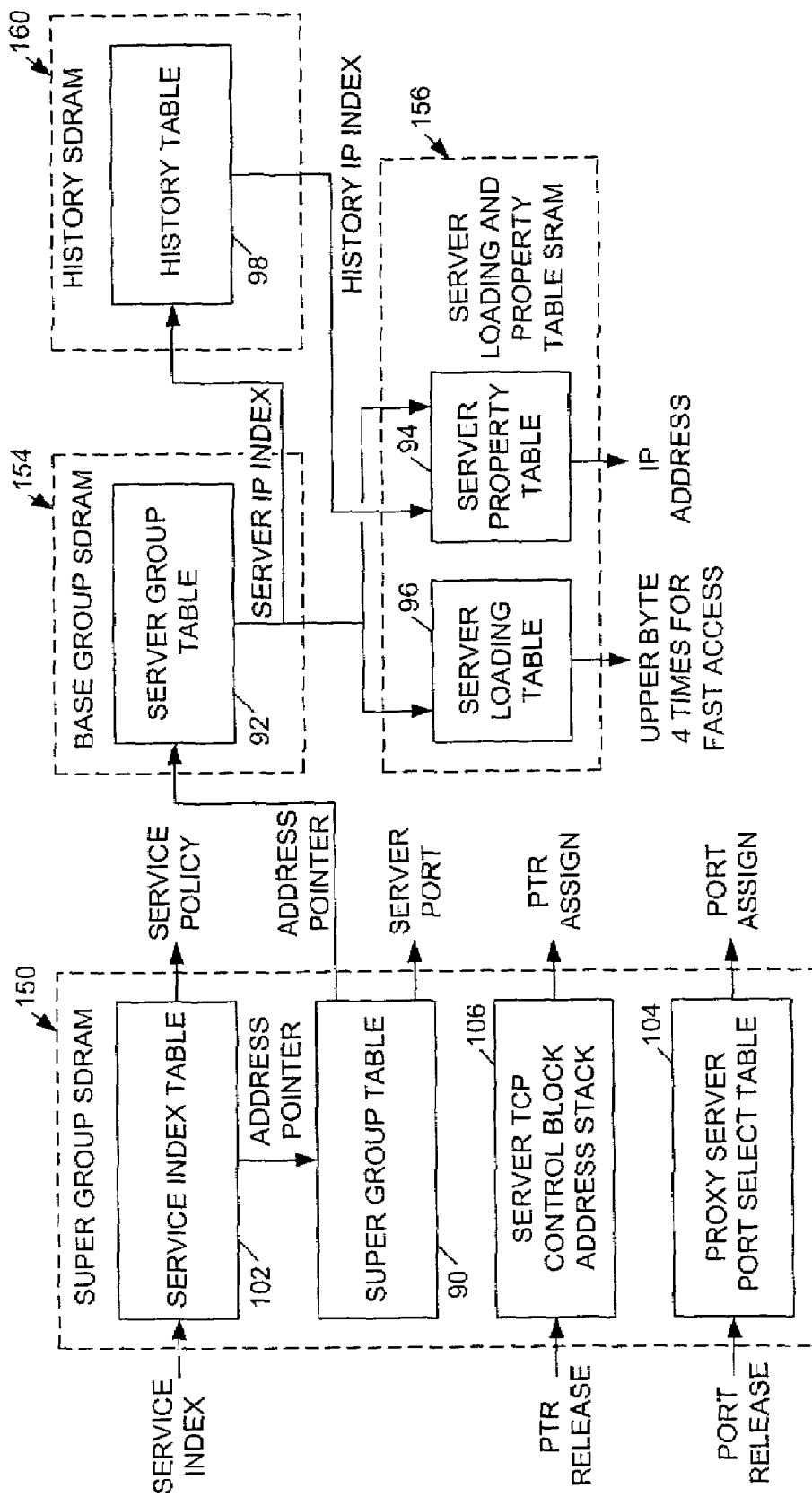
FIG. 15 is a block diagram showing various tables used by one embodiment of the policy engine.

An implementation example of the foregoing useful in the example application described in the previous section will now be described. FIG. 15 shows the location and relationship in one example of the various tables in the SRAM and SDRAM introduced in FIG. 9. In one implementation, there are three SRAMs and three SDRAMs. The super group SDRAM 150 contains the service index table 102, the super group table 90, the server TCP control block address stack 106, and the proxy server port select table 104. In one implementation, the bus width for the data path is 64 bits. The base group SDRAM 154 contains the server group table 92. The bus width for the data path is also 64 bits. The server loading and property table SRAM 156 contains the server loading table 96 and the server property table 94. The history SDRAM 160 contains the history table 98. The bus width for the data path of the history SDRAM is 64 bits.

Figure 16:
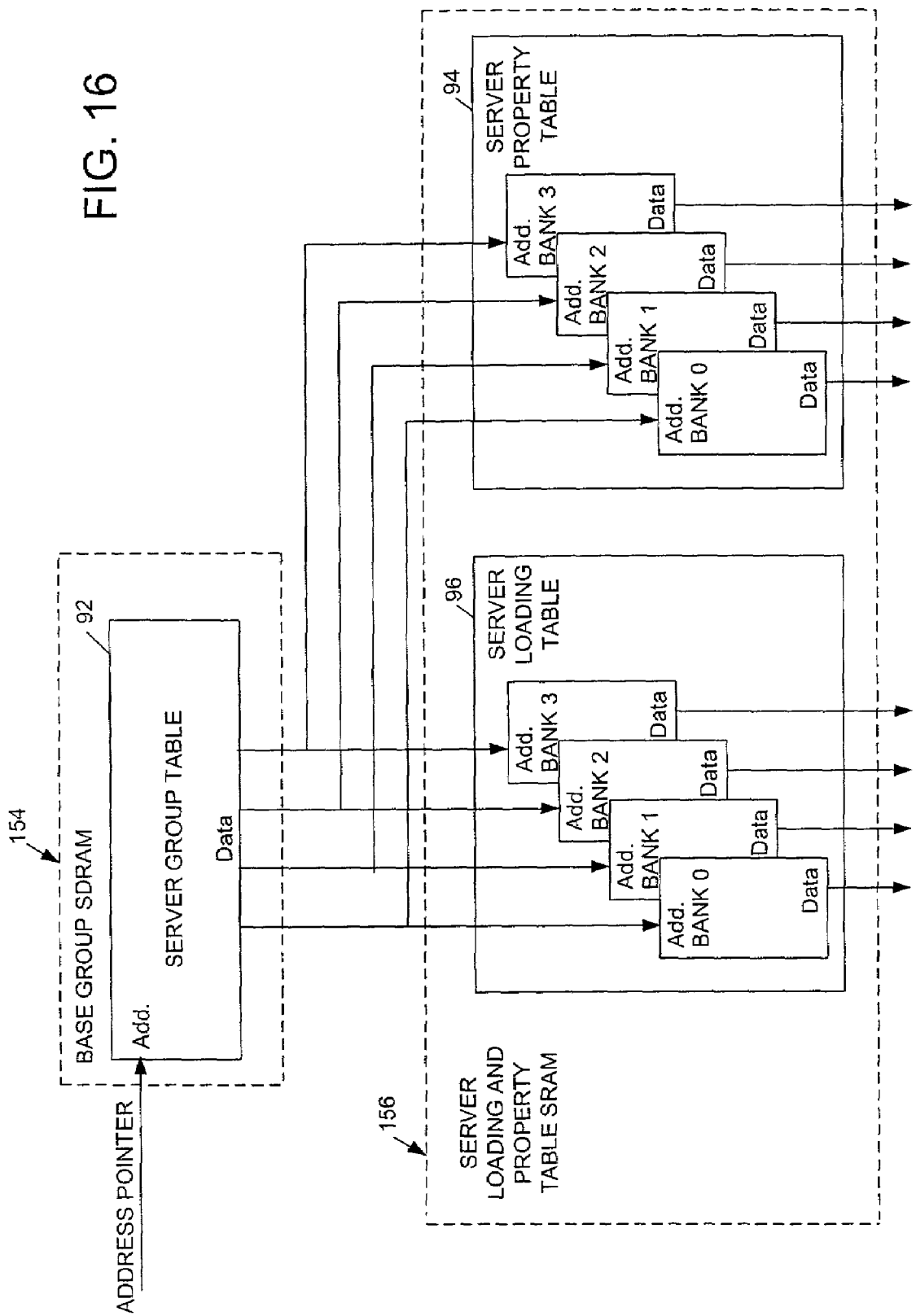
FIG. 16 shows the address/data relationship between one implementation of the server group table and the server loading and server property tables.

As shown in FIG. 16, the data bus for base group SDRAM 154 can be shared with the address bus for server loading and property table SRAM 156. In one example, server loading table 96 and server property table 94 include four banks of memory each. Each bank of memory contains the loading and property data for all servers. That is, the server loading and property information is replicated in four different places. Because the data out of base group SDRAM 154, which includes IP addresses of four servers within the selected server group output in parallel, are directly connected to the address bus of server loading and property table SRAM 156 which includes four banks each of server loading and server property data, the server loading and server property information stored within SRAM 156 is read out in parallel for four different servers at a time. By accessing this information in parallel, policy engine 40 is able to chose which server among the servers within the server group to allocate in far fewer clock cycles than if the information were stored and retrieved serially. More generally, each of the server loading table 96 and server property table 94 contain n banks of memory, each bank containing all of the loading and property information for all of the servers, such that the loading and property information for n servers residing within a single server group can be read out in parallel. Particular server groups may contain more than n servers, in which case multiple accesses to the server group table, server loading table, and server property table must be made in order to read out the loading and characteristics of all of the servers within the server group so that a choice can be made among all of the candidate servers.

Figure 17:
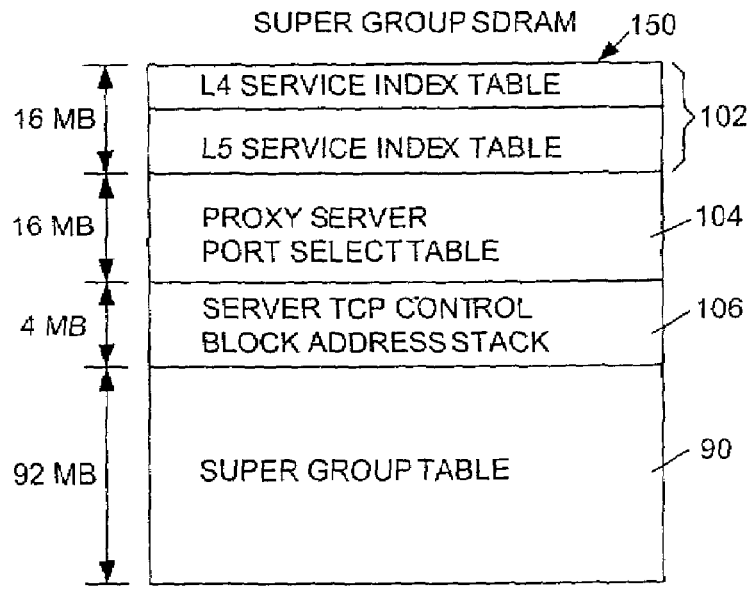
FIG. 17 is a memory map of one implementation of a super group memory.

FIG. 17 shows an example of a memory map for the super group SDRAM 150. In this example, each of the tables in the super group SDRAM 150 is aligned with the 64-bit boundary of the data path. Sixteen megabytes is allocated to the service index table 102, which is divided into a first portion indexed by L4 service indices and a second portion indexed by L5-7 service indices. Sixteen megabytes is allocated to the proxy server port select table 104, 4 megabytes is allocated to the server TCP control block address stack 106, and 92 megabytes is allocated to the super group table 90.

FIG. 18 shows one example of an entry 170 of the service index table (102 in FIG. 17). The entry 170 contains a 24-bit super group address, and an 8-bit policy code or indicator. The policy code specifies which of various pre-defined scheduling policies to apply when choosing which server from among the candidate servers within a particular server group that will be pointed to, to bind a request to. For recording statistics of the number of outstanding services, the entry also includes a total service count, a current service count, and a peak service count.

FIG. 19 shows one example of an entry 180 of the super group table (90 in FIG. 17). The entry 180 includes information for a particular super group. The entry 180 includes a total number of server base groups in the super group (denoted as MEMBER NO.), a current group index or round robin counter (CURRENT NO.) used by the round-robin load balancing policy, a server port number associated with the super group, and the physical address for each of the server base groups in the super group beginning with a first address (BASE GROUP ADDR0), and also a second address (BASE GROUP ADDR1) if there are more than one server base group in the super group. The unused fields bits in the entry 180 are indicated as reserved (RESERVED or RES'D). If there are more than two server base groups in the super group, then the entry 180 would include additional 64-bit words to hold the additional addresses of the additional server base groups in the super group. The round robin counter is read out, incremented or equivalently decremented, and rewritten such that requests are distributed evenly among server groups within each super group. Other allocations besides round robin for allocating server groups are possible.

FIG. 20 shows an example of an entry 190 in the proxy server port select table (104 in FIG. 17). The entry 190 contains a proxy server port no. and an associated proxy server IP address.

FIG. 21 shows an example of an entry 200 of the server TCP control block address stack (150 in FIG. 17). The entry 200 includes a first generation count and associated first server TCP control block address in the lower 32 bits of the 64-bit word, and a second generation count and associated second server TCP control block address in the upper 32 bits of the 64-bit word.

FIG. 22 shows that, in one example, the base group SDRAM 154 contains the server group table 92, which, in this particular example, has a size of 256 megabytes.

FIG. 23 shows one example of an entry 210 of the server group table (92 in FIG. 22). The entry 210 includes two sixty-four-bit words. The first word contains the total number of servers (MEMBER NO.) in the server base group (containing from 1 to 128 servers), a current server index (CURRENT NO.) used by the round-robin policy, an indication of a last resort server, and a flag. The second word contains up to four sixteen-bit server IP indices. If there are more than four servers in a server base group, then the corresponding entry of the server group table includes at least one additional sixty-four-bit word to contain additional server IP indices, or a flag to indicate that the server group is continued into the next table entry.

Figure 24A:
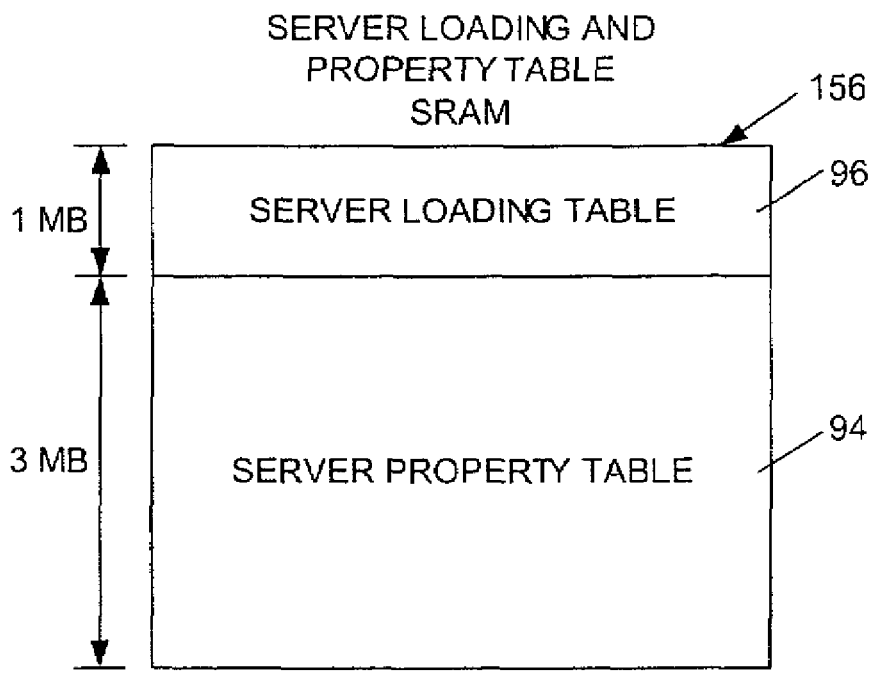
FIG. 24A shows one example of a logical organization of the server loading and property tables.
Figure 24B:
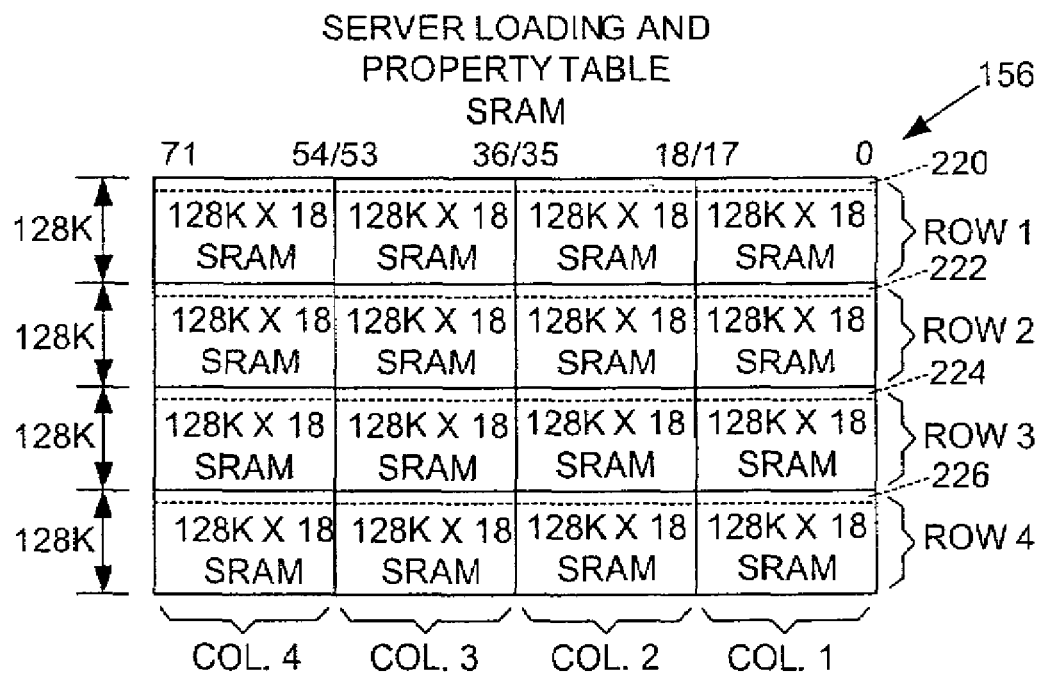
FIG. 24B shows one example of a physical organization of the server loading and property tables.

FIG. 24A shows one example of a logical organization of the server loading and property table SRAM 156. FIG. 24B shows one example of the physical organization of the same SRAM.

Figure 25:
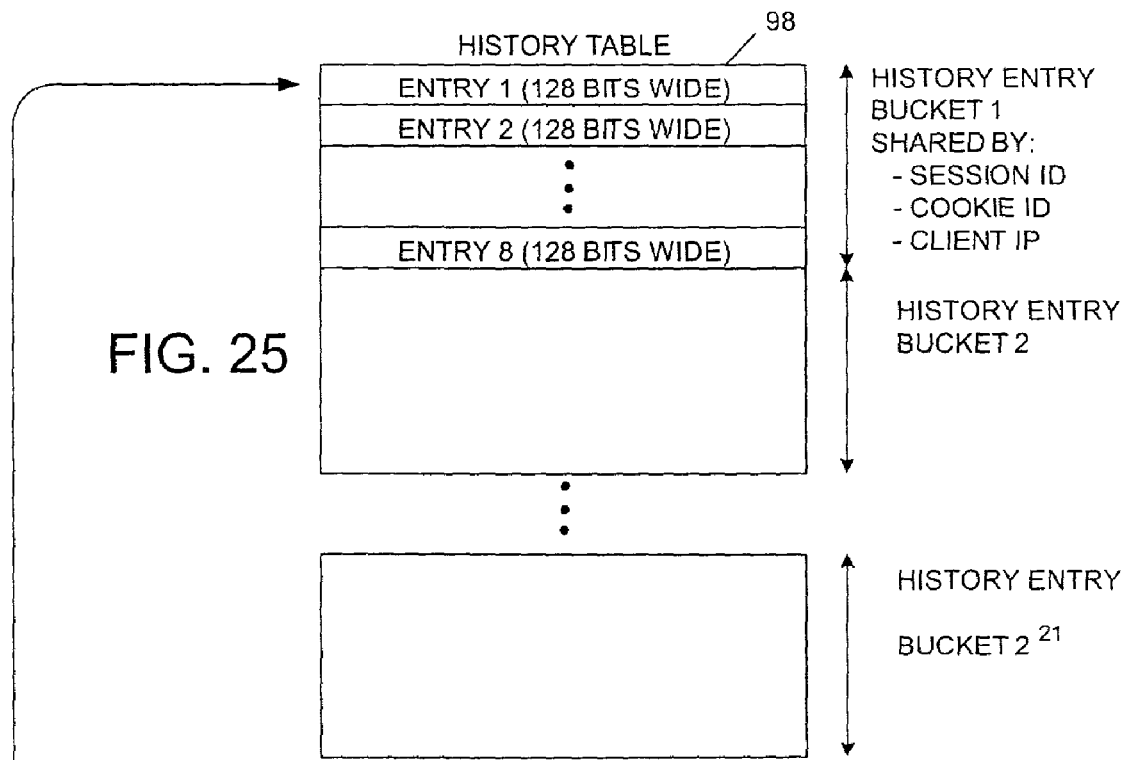
FIG. 25 shows one example of the arrangement of the history table.
Figure 26:
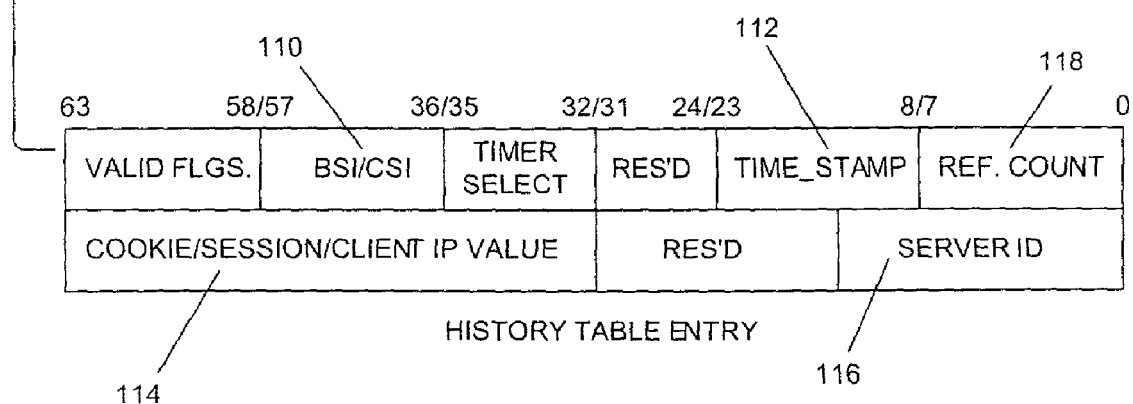
FIG. 26 shows one example of an entry of a history table bucket member.

FIG. 25 shows one example of the arrangement of the history table, and FIG. 26 shows one example of an entry within the history table. In this example, the table comprises a plurality of buckets, each bucket comprising one or more table entries. In this example, there are three possible hashing keys which may be used to store or access entries in the table: client IP address, cookie ID, and session ID. If a cookie ID or a session ID is available in relation to a resource request, then either of those is used as the key. Only if a cookie ID or a session ID is not available, is client IP address used as the key. In this particular example, keys based on cookie IDs or session IDs take precedence over those based on client IP addresses since client IP addresses may change within a particular session, and thus are not considered as reliable. Once a key is determined, a hashing function is applied to the key to produce a history table index. The history table index maps into a particular bucket of the history table. Thus, the same hashing function is applied to all three keys.

An entry is stored in the table by first determining a key for the entry, translating the key into an index using the hashing function, translating the index into a bucket, and then finding the first available storage location in the bucket. If a collision is detected, a sequential search is performed to find the next available storage location in the bucket. The entry is then stored in this location.

An entry in the table is accessed by first determining a key for the entry, translating the key into an index using the hashing function, translating the entry into a bucket, and then sequentially examining the entries in the bucket until the desired entry is located.

Referring to FIG. 26, each entry in this particular example of the history table includes a service index, identified with numeral 110, a time stamp, identified with numeral 112, the key associated with the entry, identified with numeral 114, and a counter 116 to the number of active connections associated with this entry. The service index 110 may originate from binding lookup table 108 (BLT service index, or BSI) in the case of a layer 4 connection, or from the content analysis engine 38 (CAE service index, or CSI) in the case of a layer 5-7 connection. The time stamp 112 indicates the time the entry was entered into the table. The key field 114 has already been discussed. The counter 116 is incremented every time the server associated with the entry is assigned a connection, and is decremented whenever a connection assigned to this server is terminated. The crawler accesses this field to determine whether the entry can be deleted or not.

An entry in the table is made when a connection is established. A key associated with the connection is determined. As discussed, if session ID or cookie ID is available in relation to the connection, one of these two values is used as the key for making the entry in the table. Otherwise, the client IP associated with the connection is used as the key for making the entry in the table.

Once determined, the key is translated by the hashing function into a bucket, and the next available storage location in the bucket determined through a sequential search. An entry in then made in this storage location corresponding to the connection which has been established. In particular, the service index which gave rise to the connection is stored in field 110. A time stamp indicating the time the connection was established is stored in field 112. The key is stored in field 114. The ID of the server which is bound to the connection is stored in field 116.

An entry in the history table may be deleted through one of several mechanisms. First, an entry may be marked for deletion once all connections corresponding to the entry are terminated or disconnected. A crawler running in the background accesses the counter 118 for the entry, and detects that there are no active connections assigned to it if the value of this counter is zero. It then deletes the entry after a predetermined amount of time has passed. (The crawler compares the time stamps associated with entries marked for deletion with the current time, and deletes the entry after the prescribed time has passed.) The entry is not immediately deleted upon termination of the active connections in order to support certain types of stickiness policies (to be discussed).

Second, an entry may be deleted when the bucket containing the entry is full, and space must be freed up for storage of new entries in the bucket. In one example, a bucket contains a maximum of 8 entries, and when additional space is needed in a bucket which is full, the oldest entry in the bucket is simply deleted and replaced with an entry for a new connection.

Third, an entry may be deleted simply through operation of the crawler even if the entry is not marked for deletion. In other words, the crawler runs in the background, comparing the time stamps of entries with the current time, and deletes entries if a prescribed time period has passed even if the entries are no t marked for deletion. These entries are deleted because they are sufficiently old to be considered a vestige of a connection which failed to terminate properly, possibly because the client or server associated with the connection hung up.

The entries in the history table may be used to support two types of stickiness policies. The first type seeks to allocate a server for a connection which already exists to a request from the same client for the same class of service. The second type seeks to allocate a server for a recently terminated connection to a request from the same client for the same class of service. The reason that entries are maintained in the history table for a predetermined time period after the connection has expired is to support this second type of stickiness policy.

Note that a client-initiated session may generate more than one entry in the history table. When the session first commences, an initial request for service may be received that has no session ID or cookie ID associated with it. After a binding has been made by the policy engine, that binding will be stored in history table 98 using the client IP address as the key. When another request for service is received by the same client, a session ID or cookie ID may be associated with the request. The policy engine will first examine history table 98 for entries corresponding to the received session ID or cookie ID. Failing to find a valid entry, the policy engine will next examine history table 98 for an entry corresponding to received client IP address. The policy engine will find a valid entry including a server ID, and will allocate that server to the request. The policy engine will also hash the session ID and/or the cookie ID into a hash table entry, and make an additional entry in history table 98 corresponding to the session ID or cookie ID. The history now contains multiple entries for the same client-server connection. If a third request for service is initiated by the same client, and the session ID or cookie ID is included with the request, the policy engine will search for entries corresponding to the received session or cookie ID, and locate the entry in the table which has already been established for this key. It will then determine the server associated with this entry, and allocate it to the request.

Note that hashing keys are possible which are based on truncated, compacted, or otherwise reduced, values of the session IDs, cookie IDs, or client IP addresses, as appropriate. Moreover, hashing keys are possible which are based on parameters or values associated with a connection other than session IDs, cookie IDs, or client IP addresses.

In one example, the hashing is performed using a standard 32-bit cyclic redundancy check (CRC-32) hashing algorithm, and the resulting 32-bit number is truncated to create the 21-bit history table index. The 32-bit hashing and truncation to 21 bits allows for scalability, providing for easy expansion of up to 32 bits of history table indexing. Other hashing algorithms and methods are possible, depending on the maximum expected number of servers, maximum number of connections, the maximum number of learned connections to be valid, the desirability of avoiding collisions, and other parameters.

In one example, history table 98 contains 221 buckets, with each bucket comprising 8 entries, and with each entry in a bucket comprising the key for the entry (cookie ID number, session ID number, or Client IP address) and a timestamp field indicating when the connection was established. Moreover, in this example, a sequence search is undertaken to locate the next available location in a bucket, or to locate a particular entry in a bucket. However, it should be appreciated that other configurations are possible, depending on the circumstances.

Note also that the maximum allowable age of a connection can be set to different times depending on whether the connection was associated with an L4 or an L5-7 request, the type of services that was requested, and other criteria. In this way the policy engine provides for efficient searching and aging or timing out of entries in the history table.

While various embodiments of the invention have been described, it will be apparent to those of ordinary skill in the art that many more embodiments and implementations are possible that are within the scope of this invention. For example, the number of bits of information for any given data or address field can be changed, the width of busses could be changed, and the number of storage locations could be changed, all to suit the needs of a given application without departing from the scope of the invention. It will also be recognized that the present invention can be easily adapted to various types of communication networks using various communication protocols, or other applications besides servicing requests in a TCP/IP network.

What is claimed is:

1. A system for allocating resources to service requests comprising:
   a load balancing manager;
   a service index table, part of the load balancing manager, having a plurality of super group indexes, the service index table to receive a first service index corresponding to a service request, the service index table to provide a first of a plurality super group indexes in response to the first service index, the service index table to provide a first of a plurality of balancing policies in response to receiving the service index;
   a super group block, part of the load balancing manager, to provide a first of a plurality of super groups, each super group having one or more resource group indexes in response to the provision of the first super group index;
   a first load balancer, part of the load balancing manager, to select a first resource group index from among the first super group based on the first load balancing policy;
   a group block, part of the load balancing manager, to provide one or more resource indexes in response to the provision of the first resource group index, each resource index corresponding to one of a plurality of resources; and
   a second load balancer, part of the load balancing manager, to select a first resource index from among the one or more resource indexes based on a second load balancing policy, to allocate the resource corresponding to the first resource index.

2. The system of claim 1 wherein the resource is a server.

3. The system of claim 1 wherein the second load balancing policy is selected based on the first load balancing policy index.

4. The system of claim 1 wherein the second load balancing policy is selected independently of the first load balancing policy index.

5. The system of claim 1 further comprising a content analysis engine configured to receive at least a portion of a data packet and generate a service index based on at least one of domain name and URL pattern matching.

6. The system of claim 1 further comprising a lookup table coupled to receive at least a portion of a data packet, the lookup table to select the service index based on at least one of a destination IP, a destination port and a protocol corresponding to the data packet.

7. The system of claim 1 further comprising a history table to override the load balancing manager and select a resource based on a persistence policy if a match is found in the history table corresponding to the service request.

8. A method for allocating resources to service requests comprising:
   receiving a service index at a load balancing manager comprising a service index table having a plurality of super group indexes, the service index corresponding to a service request;
   selecting a first of the super group indexes in response to receiving the service index;
   generating a first load balancing policy index in response to receiving the service index;
   selecting a first load balancing policy from among a plurality of load balancing policies based on the first load balancing policy index;
   generating a plurality of resource group indexes in response to the selecting of the first super group index;
   applying the first load balancing policy to select one of the plurality of resource group indexes:
   generating one or more resource indexes in response to the selection of the one resource group index, the at least one resource index corresponding to at least one of a plurality of resources;
   selecting a second load balancing policy;
   applying the second load balancing policy to select one of the at least one resource index; and
   assigning a first resource to the service request, the one resource index indicating the resource.

9. The method of claim 8 wherein the resource is a server.

10. The method of claim 8 further comprising selecting the second load balancing policy based on the first load balancing policy index.

11. The method of claim 8 further comprising selecting the second load balancing policy independently of the first load balancing policy index.

12. The method of claim 8 further comprising:
    receiving at least a portion of a data packet having a domain name and a URL; and
    generating a service index based on the domain name and pattern matching of within the URL.

13. The method of claim 8 further comprising:
    receiving at least a portion of a data packet having a destination IP, a destination port and a protocol; and
    generating a service index based on at least one of the destination IP, the destination port and the protocol.

14. The method of claim 8 further comprising overriding the assigning of the first resource and assigning a second resource to the service request based on a persistence policy if a match is found in a history table corresponding to the service request.

15. The method of claim 14 wherein the steps of generating the first super group index, generating a first load balancing policy index selecting a first load balancing policy, generating a plurality of group indexes, generating one or more resource indexes, and assigning a first resource being performed only if a match is not found in the history table corresponding to the service request.

* * * * *